United States Patent
Oh et al.

(10) Patent No.: US 10,419,718 B2
(45) Date of Patent: Sep. 17, 2019

(54) METHOD AND DEVICE FOR TRANSMITTING AND RECEIVING BROADCAST SIGNAL

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 15/321,054

(22) PCT Filed: Jul. 10, 2015

(86) PCT No.: PCT/KR2015/007201
§ 371 (c)(1),
(2) Date: Dec. 21, 2016

(87) PCT Pub. No.: WO2016/006970
PCT Pub. Date: Jan. 14, 2016

(65) Prior Publication Data
US 2018/0191997 A1 Jul. 5, 2018

Related U.S. Application Data

(60) Provisional application No. 62/023,198, filed on Jul. 11, 2014, provisional application No. 62/030,581, filed on Jul. 29, 2014.

(51) Int. Cl.
*H04N 7/16* (2011.01)
*H04N 7/088* (2006.01)
(Continued)

(52) U.S. Cl.
CPC ......... *H04N 7/0885* (2013.01); *H04N 21/235* (2013.01); *H04N 21/2353* (2013.01);
(Continued)

(58) Field of Classification Search
CPC ............ H04N 21/235; H04N 21/2353; H04N 21/4884; H04N 21/4312; H04N 21/8543
(Continued)

(56) References Cited

U.S. PATENT DOCUMENTS 8,718,367 B1    5/2014  Schneider et al.
9,161,066 B1 *  10/2015 Oztaskent ............ H04N 21/24
(Continued)

FOREIGN PATENT DOCUMENTS

CN    101617539 A    12/2009
CN    102065234 A    5/2011
(Continued)

OTHER PUBLICATIONS

XP030115562: Fogg C et al., "Indication of SPMTE 2084, 2085 and carriage of 2086 metadata in HEVC," 16. JCT-VC Meeting; Jan. 9, 2014-Jan. 17, 2014, San Jose, Ca, p. 1-5.
(Continued)

*Primary Examiner* — Michael B. Pierorazio
(74) *Attorney, Agent, or Firm* — Dentons US LLP

(57) ABSTRACT

The present invention relates to a device and a method for transmitting and receiving a broadcast signal comprising a subtitling service. Provided in one embodiment of the present invention is a method for transmitting a broadcast signal, the method comprising the steps of: generating a broadcast signal comprising video data and subtitle data; and transmitting the generated broadcast signal. According to the embodiment of the present invention, a transport stream providing a digital broadcast subtitling service using an XML subtitle may be transmitted.

14 Claims, 21 Drawing Sheets

(51) Int. Cl.
*H04N 21/235* (2011.01)
*H04N 21/431* (2011.01)
*H04N 21/488* (2011.01)
*H04N 21/8543* (2011.01)

(52) U.S. Cl.
CPC ..... *H04N 21/4312* (2013.01); *H04N 21/4884* (2013.01); *H04N 21/8543* (2013.01)

(58) Field of Classification Search
USPC ........................................................ 725/135
See application file for complete search history.

(56) References Cited

U.S. PATENT DOCUMENTS

| | | |
|---|---|---|
| 2006/0136803 A1 | 6/2006 | Erol et al. |
| 2008/0212938 A1 | 9/2008 | Sato et al. |
| 2009/0278986 A1 | 11/2009 | Ikegami |
| 2010/0220175 A1 | 9/2010 | Claydon et al. |
| 2011/0242104 A1 | 10/2011 | Zhang et al. |
| 2011/0310224 A1 | 12/2011 | Lee et al. |
| 2013/0185760 A1 | 7/2013 | Yamagishi et al. |
| 2014/0009677 A1 | 1/2014 | Homyack et al. |
| 2015/0195587 A1 | 7/2015 | Tsukagoshi |
| 2015/0256846 A1 | 9/2015 | Hattori et al. |
| 2015/0304730 A1 | 10/2015 | Yamagishi et al. |
| 2016/0005201 A1 | 1/2016 | Kunkel et al. |
| 2016/0163356 A1 | 6/2016 | De Haan et al. |
| 2016/0218883 A1* | 7/2016 | Lee .......... H04L 67/06 |
| 2016/0373712 A1 | 12/2016 | Yamamoto et al. |
| 2017/0104885 A1 | 4/2017 | Amtrup et al. |
| 2017/0118498 A1* | 4/2017 | Kwak .................. H04N 21/43 |

FOREIGN PATENT DOCUMENTS

| | | |
|---|---|---|
| CN | 102232294 A | 11/2011 |
| CN | 102273210 A | 12/2011 |
| CN | 103179093 A | 6/2013 |
| CN | 103826114 A | 5/2014 |
| KR | 10-2004-0051446 A | 6/2004 |
| KR | 10-2005-0083102 A | 8/2005 |
| KR | 1020080078217 A | 8/2008 |
| KR | 1020100115845 A | 10/2010 |
| WO | 2010095838 A2 | 8/2010 |
| WO | 2011129631 A2 | 10/2011 |

OTHER PUBLICATIONS

XP030006466:Segall A et al., "Tone mapping SEI", 19. JVT Meeting Mar. 31, 2006-Apr. 7, 2006, Geneva, CH, p. 1-9.

* cited by examiner

FIG. 5

```
<tt:tt ttp:timeBase = "media" xml:lang= "en"/>
<tt:head>
  <tt:metadata>
    <ebuttm:documentMetadata
      ....
      ebuttm:documentTargetAspectRatio
      ebuttm:RefGamut = "BT2020"
      ebuttm:RefDynamicRange = 2000 100 200000
      ebuttm:EOTF = "SMPTE2084"
      ebuttm:RefBitDepth = 12
      .... />
  </tt:metadata>
<tt:styling>
  <tt:style xml:id= "BaseStyle" tts:color = "red", ebutts:colorExtent = "0F040A" tts:backgroundColor = "yellow" ebutts:backgroundColorExtent = "010803" .... />
  <tt:style xml:id= "Style1" tts:textAlign = "start" .... />
</tt:styling>
<tt:layout>
  <tt:region xml:id= "region1" tts:origin="0% 0%" tts:extent="50% 100%" .... />
</tt:layout>
</tt:head>
<tt:body>
  <tt:div style = "BaseStyle">
    <tt:p region = "region1" style = "Style1" begin= "00:00:00:00" end="00:00:01:00"> text line 1 </tt:p>
  </tt:div>
</tt:body>
</tt:tt>
```

FIG. 6

```
ebuttm:RefGamut
  : xRed yRed xGreen yGreen xBlue yBlue xWhite yWhite
  | <namedGamut> xRed | yRed | xGreen | yGreen | xBlue | yBlue | xWhite | yWhite
  : <digit>+                          // value = originalValue  *10000
```

```
<namedGamut>
  : "BT709"      // 6400  3300  3000  6000  1500   600  3127  3290
  | "BT2020"     // 7080  2920  1700  7970  1310  4600  3127  3290
```

(a)

```
ebuttm:RefDynamicRange
  : PeakBrightness BlackLevel ContrastRatio
  | <namedDynamicRange>

PeakBrightness | BlackLevel | ContrastRatio
  : <digit>+ // BlackLevel = OriginalValue *10000;
```

```
<namedDynamicRange>
  : "SMPTERefHD"                      // 100  500  200
```

(b)

```
ebuttm:EOTF
  :<namedEOTF>
```

```
<namedEOTF>
  : "BT1886"
  | "SMPTE2084"
```

```
ebuttm:RefBitDepth
    : <digit>+  // valid range: [1,16]
```

(a)

```
<ebuttdt:distributionColorType>
   : "#" rrggbb  | "#" rrggbbaa
rrggbb
    : hexDigit{6}
rrggbbaa
    : hexDigit{8}
hexDigit
    : [0-9] | [a-f] | [A-F]
```

(b)

```
ebuttds:colorExtent
    :<ebuttdt:distributionColorType>
```

```
<color>
   : "#" rrggbb
   | "#" rrggbbaa
   | "rgb" "(" r-value "," g-value "," b-value ")"
   | "rgba" "(" r-value "," g-value "," b-value "," a-value ")"
   | <namedColor>
rrggbb
   : <hexDigit>{6}
rrggbbaa
   : <hexDigit>{8}
r-value | g-value | b-value | a-value
   : component-value
component-value
   : non-negative-integer // valid range: [0,255]
non-negative-integer
   : <digit>+
```

(a)

```
tts:colorExtent
   :<color>
```

(b)

```
<tt:style tts:color = "rgb(255,0,0)", tts:colorExtent = "rgb(15,4,10)".... />
```

```
<tt:style tts:color = "red", tts:colorExtent = "0F040A". /> <
```

```
<tt:tt ttp:timeBase = "media" xml:lang= "en">
  <tt:head>
    <tt:metadata>
      <ebuttm:documentMetadata
        ....
        ebuttm:documentTargetAspectRatio
        ebuttm:Gamut = "BT709"
        ebuttm:DynamicRange = 100  500  2000
        ebuttm:EOTF = "BT1886"
        ebuttm:BitDepth = 8
        ebuttm:SupplementaryGamut = "BT2020"
        ebuttm:SupplementaryDynamicRange = 2000  100  200000  500  100
        ebuttm:SupplementaryEOTF = "SMPTE2084"
        ebuttm:SupplementaryBitDepth = 12
        .... />
    </tt:metadata>
    <tt:styling>
      <tt:style xml:id = "BaseStyle" tts:color = "red"  tts:backgroundColor = "yellow" .... />
      <tt:style xml:id= "Style1" tts:color = "rrggbb", tts:colorSupplementary = "#RRRGGGBBB" tts:backgroundColor = "r'r'g'b'b'" tts:backgroundColorSupplementary= "#-R'R'R'G'G'G'B'B'B'" .... />
    </tt:styling>
    <tt:layout>
      <tt:region xml:id= "region1" tts:origin="0% 0%" tts:extent="50% 100%" .... />
    </tt:layout>
  </tt:head>
  <tt:body>
    <tt:div style = "BaseStyle">
      <tt:p region = "region1" style = "Style1" begin= "00:00:00:00" end="00:00:01:00"> text line 1 </tt:p>
    </tt:div>
  </tt:body>
</tt:tt>
```

FIG. 13

```
<tt:tt ttp:timeBase = "media" xml:lang= "en">
  <tt:head>
    <tt:metadata>
      <ebuttm:documentMetadata
        ....
        ebuttm:documentTargetAspectRatio
        ebuttm:Gamuts = "BT709" "BT2020"
        ebuttm:DynamicRanges = 100  500  2000  2000  100  200000  500  100
        ebuttm:EOTFs = "BT1886" "SMPTE2084"
        ebuttm:BitDepths = 8  12
        ebuttm:ColorTransformation= "video"  "function"  "linear"  500
        .... />
    </tt:metadata>
    <tt:styling>
      <tt:style xml:id = "BaseStyle" tts:color = "red tts:backgroundColor = "yellow" .... />
      <tt:style xml:id= "Style1" tts:textAlign = "start" .... />
    </tt:styling>
    <tt:layout>
      <tt:region xml:id= "region1" tts:origin="0% 0%" tts:extent="50% 100%" .... />
    </tt:layout>
  </tt:head>
</tt:tt>
```

FIG. 14

```
ebuttm:Gamut
  : xRed yRed xGreen yGreen xBlue yBlue xWhite yWhite
  | <namedGamut> xRed | yRed | xGreen | yGreen | xBlue | yBlue | xWhite | yWhite
  : <digit>+           // value = originalValue *10000
```

```
ebuttm:SupplementryGamut
  : xRed yRed xGreen yGreen xBlue yBlue xWhite yWhite
  | <namedGamut> xRed | yRed | xGreen | yGreen | xBlue | yBlue | xWhite | yWhite
  : <digit>+           // value = originalValue *10000
```

```
<namedGamut>
  : "BT709"   // 6400 3300 3000 6000 1500  600 3127 3290
  | "BT2020"  // 7080 2920 1700 7970 1310 4600 3127 3290
```

(a)

```
ebuttm:Gamuts
 : xRed yRed xGreen yGreen xBlue yBlue xWhite yWhite
   xRed2 yRed2 xGreen2 yGreen2 xBlue2 yBlue2 xWhite2 yWhite2
   | <namedGamut> <namedGamut>
   | <namedGamut> xRed2 yRed2 xGreen2 yGreen2 xBlue2 yBlue2 xWhite2 yWhite2
   | xRed yRed xGreen yGreen xBlue yBlue xWhite yWhite <namedGamut> xRed | yRed | xGreen | yGreen | xBlue | yBlue | xWhite | yWhite |
xRed2 | yRed2 | xGreen2 | yGreen2 | xBlue2 | yBlue2 | xWhite2 | yWhite2
  : <digit>+           // value = originalValue *10000
```

```
ebuttm:DynamicRange
  : PeakBrightness  BlackLevel  ContrastRatio  HighTone? LowTone?
  | <namedDynamicRange>

PeakBrightness | BlackLevel | ContrastRatio | HighTone | LowTone
  : <digit>+     // BlackLevel = OriginalValue *10000;
```

```
ebuttm:SupplementaryDynamicRange
  : PeakBrightness  BlackLevel  ContrastRatio   HighTone? LowTone?
  | <namedDynamicRange>

PeakBrightness | BlackLevel | ContrastRatio | HighTone | LowTone
  : <digit>+     // BlackLevel = OriginalValue *10000;
```

```
<namedDynamicRange>
  : "SMPTERefHD"    // 100 500 200
```

(a)

```
ebuttm:DynamicRanges
  : PeakBrightness  BlackLevel  ContrastRatio  PeakBrightness2  BlackLevel2  ContrastRatio2 HighTone? LowTone?
  | <namedDynamicRange> <namedDynamicRange> HighTone? LowTone?
  | <namedDynamicRange> PeakBrightness2  BlackLevel2 ContrastRatio2 HighTone? LowTone?
  | PeakBrightness  BlackLevel  ContrastRatio <namedDynamicRange> HighTone? LowTone?

PeakBrightness | BlackLevel | ContrastRatio | PeakBrightness2 | BlackLevel2 | ContrastRatio2 | HighTone | LowTone
  : <digit>+     // BlackLevel = OriginalValue *10000;
```

```
ebuttm:EOTF
  :<namedEOTF>
```

```
ebuttm:SupplementaryEOTF
  :<namedEOTF>
```

```
Ebuttm:EOTFs
  :<namedEOTF> <namedEOTF>
```

```
<namedEOTF>
  : "BT1886"
  | "SMPTE2084"
```

(a)

```
ebuttm:BitDepth
  : <digit>+        // valid range: [1,16]
```

```
ebuttm:SupplementaryBitDepth
  : <digit>+        // valid range: [1,16]
```

```
Ebuttm:BitDepths
  : <digit>+ <digit>+   // valid range: [1,16]
```

<tt:style xml:id = "BaseStyle" tts:color = "red tts:backgroundColor = "yellow" .... />

(a)

<tt:style xml:id= "Style1" tts:color = "#rrggbb", tts:colorSupplementary = "#RRRGGGBBB".... />

<ebuttdt:distributionColorTypeExtension12>
  : "#" rrrgggbbb | "#" rrrgggbbbaaa
rrrgggbbb
  : hexDigit{9}
rrrgggbbbaaa
  : hexDigit{12}
hexDigit
  : [0-9] | [a-f] | [A-F]

<ebuttdt:distributionColorTypeExtension16>
  : "#" rtrrgnggbbbb | "#" rrrggggbbbbaaaa
rrrggbgbbbb
  : hexDigit{12}
rrrggggbbbbaaaa
  : hexDigit{16}
hexDigit
  : [0-9] | [a-f] | [A-F]

```
<tt:style xml:id= "Style1" tts:backgroundColor = "r'r'g'b'b' " tts:backgroundColorSupplementary= "#-R'R'R'G'G'B'B'B'".... />
```

```
<ebuttdt:distributionColorDifferenceTypeExtension12>
  : "#" sign rrrgggbbb  | "#" sign rrrgggbbbaaa
  sign
     : "+" | "-"
  rrrgggbbb
     : hexDigit{9}
  rrrgggbbbaaa
     : hexDigit{12}
  hexDigit
     : [0-9] | [a-f] | [A-F]
```

```
< ebuttdt:distributionColorDifferenceTypeExtension 16>
  : "#" sign rtrrgnggbbbb  | "#" sign rrrrggggbbbbaaaa
  sign
     : "+" | "-"
  rrrggbgbbbb
     : hexDigit{12}
  rrrrggggbbbbaaaa
     : hexDigit{16}
  hexDigit
     : [0-9] | [a-f] | [A-F]
```

FIG. 19

```
ebuttm:ColorTransformation
    : CGoption DRoption CGdetail? DRdetail?
CGoption
    : "video" | "tone" | "LUT" | "function"   Number?
DRoption
    : "video" | "tone" | "LUT" | "function"   Number? Type? HighTone? LowTone?
CGdetail
    : for(i=0; i< Number ; i++)  <digit>+ <digit>+ <digit>+ <digit>+ <digit>+ <digit>+   // e.g. RGB to RGB LUT
    | for(i=0; i< Number ; i++)  <digit>+            // transformation function coefficient
DRdetail
    : for(i=0; i< Number ; i++)  <digit>+ <digit>+    // LUT
    | for(i=0; i< Number ; i++)  <digit>+            // transformation function coefficient
Number
    : <digit>+
HighTone
    : <digit>+              // nit 단위
LowTone
    : <digit>+              // nit 단위, LowTone = OriginalValue *10000;
Type
    : linear | exp | piecewise linear | log | s-curve
```

FIG. 20

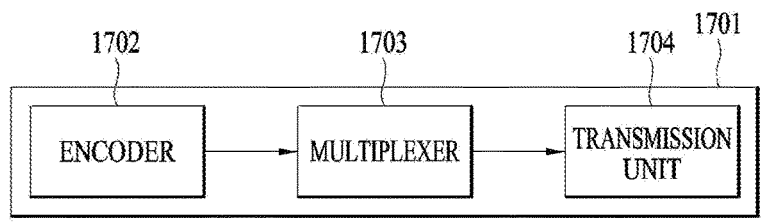

METHOD AND DEVICE FOR TRANSMITTING AND RECEIVING BROADCAST SIGNAL

This application is a National Stage Application of International Application No. PCT/KR2015/007201, filed Jul. 10, 2015, and claims the benefit of U.S. Provisional Application Nos. 62/023,198, filed Jul. 11, 2014 and 62/030,581, filed Jul. 29, 2014, and the contents of which are incorporated herein by reference in their entirety for all purposes as if fully set forth below.

TECHNICAL FIELD

The present invention relates to a method and device for transmitting and receiving a broadcast signal.

BACKGROUND ART

With development of digital technology and communication technology, dissemination of and demand for multimedia content centered on audio/video in various fields including the Internet and personal media as well as broadcast and movie have rapidly increased. Further, consumer demand for realistic media for providing three-dimensional effects through broadcast and movie has increased. In addition, with development of display technology, TV screens used in households have been enlarged and thus consumption of high-quality content such as high definition (HD) content has increased. Along with 3DTVs, a realistic broadcast such as ultra high definition TV (UHDTV) has attracted attention as a next-generation broadcast service. In particular, a discussion about an ultra high definition (UHD) broadcast service has been increased.

A current broadcast subtitle service is being provided in the form of closed captioning or digital video broadcasting (DVB) subtitles. Since DVB subtitles are provided in the form of a bitmap image, subtitles having different sizes should be provided to images having various sizes or subtitles having a single size should be scaled. At this time, bandwidth efficiency may deteriorate in the former case and scaling sharpness may deteriorate in the latter case. In particular, recently, since HD broadcast services using UHDTVs have been actively discussed, necessity of a new broadcast subtitle service has emerged. In addition, a high-quality subtitle service having backward compatibility is also required according to phased change in image quality element of UHD.

DISCLOSURE

Technical Problem

An object of the present invention is to increase transmission efficiency in a method and device for transmitting a broadcast signal.

Another object of the present invention is to provide a transmission method and device for providing a subtitle service in a broadcast network.

Another object of the present invention is to provide a broadcast method and device capable of improving quality of a subtitle service.

Technical Solution

A method of transmitting a broadcast signal according to an embodiment of the present invention may include generating the broadcast signal including video data and subtitle data and transmitting the generated broadcast signal.

In the method of transmitting the broadcast signal according to the embodiment of the present invention, the subtitle data may include XML subtitle data.

In the method of transmitting the broadcast signal according to the embodiment of the present invention, the XML subtitle data may include subtitle text and subtitle metadata.

In the method of transmitting the broadcast signal according to the embodiment of the present invention, the subtitle metadata may include information corresponding to a wide color gamut and a high dynamic range for a high-quality broadcast.

In the method of transmitting the broadcast signal according to the embodiment of the present invention, the subtitle metadata may include information on a color gamut of subtitles, a dynamic range of the subtitles and a bit depth of the subtitles.

In the method of transmitting the broadcast signal according to the embodiment of the present invention, the subtitle metadata may include base information and supplementary information of a color gamut of subtitles, a dynamic range of the subtitles and a bit depth of the subtitles.

A method of receiving a broadcast signal according to an embodiment of the present invention may include receiving the broadcast signal including video data and subtitle data and processing and outputting the video data and the subtitle data.

In the method of receiving the broadcast signal according to the embodiment of the present invention, the subtitle data may include XML subtitle data.

In the method of receiving the broadcast signal according to the embodiment of the present invention, the XML subtitle data may include subtitle text and subtitle metadata.

In the method of receiving the broadcast signal according to the embodiment of the present invention, the subtitle metadata may include information corresponding to a wide color gamut and a high dynamic range for a high-quality broadcast.

In the method of receiving the broadcast signal according to the embodiment of the present invention, the subtitle metadata may include information corresponding to a wide color gamut and a high dynamic range for a high-quality broadcast.

In the method of receiving the broadcast signal according to the embodiment of the present invention, the subtitle metadata may include information on a color gamut of subtitles, a dynamic range of the subtitles and a bit depth of the subtitles.

In the method of receiving the broadcast signal according to the embodiment of the present invention, the video data further includes video metadata.

The method of receiving the broadcast signal according to the embodiment of the present invention may further include detecting whether the subtitle metadata and the video metadata match.

The method of receiving the broadcast signal according to the embodiment of the present invention may further include converting the subtitle metadata if the subtitle metadata and the video metadata do not match.

In the method of receiving the broadcast signal according to the embodiment of the present invention, the subtitle metadata may include base information and supplementary information of a color gamut of subtitles, a dynamic range of the subtitles and a bit depth of the subtitles.

The method of receiving the broadcast signal according to the embodiment of the present invention may further include detecting whether a receiver display attribute and the subtitle metadata matches.

In the method of receiving the broadcast signal according to the embodiment of the present invention, the subtitle metadata may include information on at least one color gamut, dynamic range and bit depth supporting a plurality of services.

In the method of receiving the broadcast signal according to the embodiment of the present invention, the subtitle metadata may include information on a color gamut, a dynamic range and a bit depth, and a color transformation function.

Advantageous Effects

According to the embodiments of the present invention, it is possible to increase transmission efficiency in a method and device for transmitting a broadcast signal.

According to the embodiments of the present invention, it is possible to provide a high-quality subtitle service in a broadcast network.

According to the embodiments of the present invention, it is possible to provide a subtitle service with backward compatibility in a broadcast network.

According to the embodiments of the present invention, a broadcast reception device may extract and display a subtitle included in a broadcast signal.

DESCRIPTION OF DRAWINGS

FIG. 5 is a diagram showing a method of transmitting metadata of subtitles according to an embodiment of the present invention.

FIG. 6 is a diagram showing a detailed description of elements of metadata of subtitles according to an embodiment of the present invention.

FIG. 7 is a diagram showing a detailed description of elements of metadata of subtitles according to an embodiment of the present invention.

FIG. 8 is a diagram showing an additional description of elements of metadata of subtitles according to an embodiment of the present invention.

FIG. 12 is a diagram showing metadata including information on subtitles according to an embodiment of the present invention.

FIG. 13 is a diagram showing metadata including information on subtitles according to another embodiment of the present invention.

FIG. 14 is a diagram showing a detailed description of elements of metadata of subtitles according to an embodiment of the present invention.

FIG. 15 is a diagram showing a detailed description of elements of metadata of subtitles according to an embodiment of the present invention.

FIG. 16 is a diagram showing a detailed description of elements of metadata of subtitles according to an embodiment of the present invention.

FIG. 17 is a diagram showing a method of expressing the color of subtitles according to an embodiment of the present invention.

FIG. 18 is a diagram showing a method of expressing the color of subtitles according to another embodiment of the present invention.

FIG. 19 is a diagram showing a method of expressing the color of subtitles according to another embodiment of the present invention.

FIG. 20 is a block diagram showing a broadcast transmitter according to an embodiment of the present invention.

BEST MODE

Figure 1:
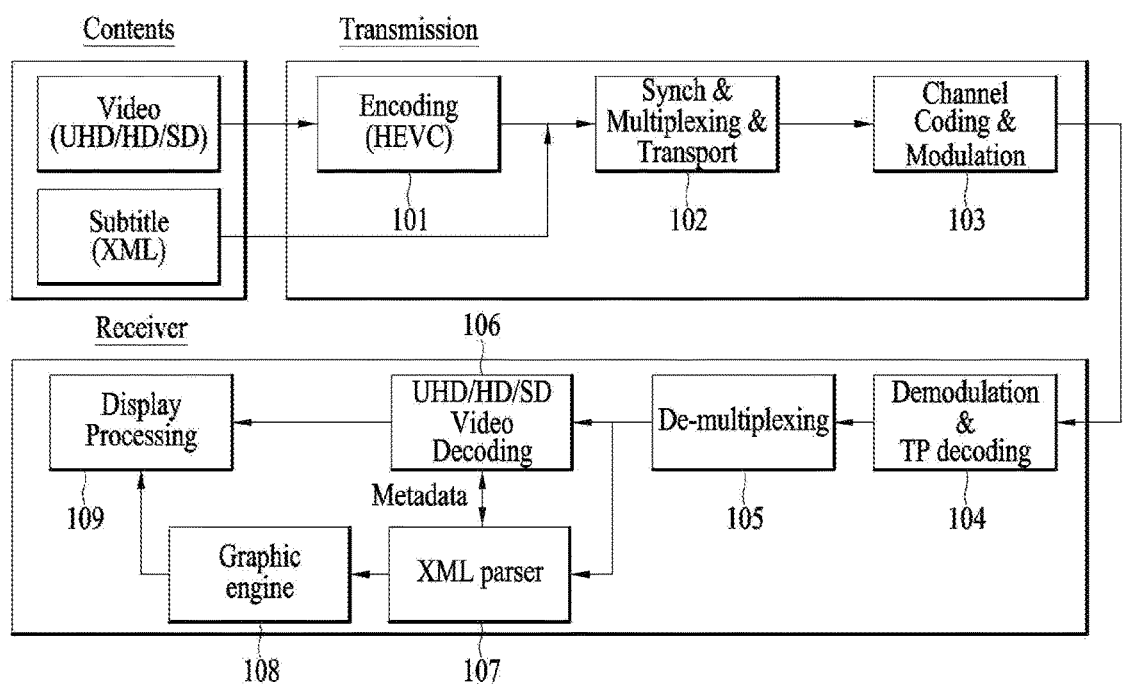
FIG. 1 is a diagram showing an XML based broadcast subtitle service according to an embodiment of the present invention.

As a broadcast service starts to be provided through Internet protocol (IP) as a next-generation broadcast service, a new subtitle service standard which will replace existing broadcast subtitles was established. A combination of an existing broadcast and an IP will be provided as a future broadcast service. At this time, when subtitles generated according to different standards are provided, efficiency may deteriorate.

The present invention describes a method of providing a subtitle service in old and new receivers based on high-quality image elements such as WCG, HDR and higher bit depth upon providing a digital image subtitle service using XML subtitles (TTML, SMPTE-TT, EBU-TT-D, etc.).

Recently, a standard of subtitles based on XML such as time text markup language (TTML) and EBU time text (EBU-TT) has been established. Although this standard aims at a subtitle service in a media and IP streaming environment, standard groups such as DVB and ATSC attempt to use this standard even in a broadcast service. To this end, it is possible to use a unified subtitle source in various broadcast environments and to adaptively use the same subtitle source in various service environments (e.g., HD, UHD, etc.).

XML based subtitles are being considered as a UHD based next-generation subtitle service method, since XML based subtitles are configured to support video having various sizes and are suitable for an IP streaming based service. Change from HD to UHD leads to resolution improvement and change in various image quality aspects such as dynamic range, color gamut, and bit depth. Therefore, in a next-generation subtitle service, such image elements need to be considered. However, current TTML based XML subtitles do not consider such elements and needs to consider elements such as WCG and HDR in order to cope with various service environments.

Hereinafter, a method of providing a suitable subtitle service even when a subtitle production environment and a display environment are different in terms of the image quality elements such as color gamut and luminance range in provision of an XML based broadcast media subtitle service will be described.

In the present invention, as a method of utilizing subtitles produced based on XML in a broadcast media service, XML subtitles metadata service method capable of delivering information on a production environment of XML subtitles in order to support receivers and displays having various capabilities in terms of HDR and WCG will be described.

In addition, the present invention proposes a method of expressing a maximum of 16 bits while continuously supporting an existing 8-bit system in a state in which the bitdepth of XML subtitles is restricted to 8 bits.

In addition, in the present invention, operation of a receiver related to color gamut, dynamic range and bit depth when a subtitle production environment and an image reproduction environment are different will be described.

For understanding of the present invention and convenience of description, terms and abbreviations will be defined as follows.

HEVC (High Efficiency Video Coding) is a high-efficiency video coding standard for providing the same video quality with a compression ratio which is about twice that of existing H.265/AVC technology.

XML (Extensible Markup Language) is a language produced by improving an HTML and can improve a homepage establishment function, a search function, etc. and easily process complex data of a client system. In the present invention, XML is used as a language configuring subtitle data and XML subtitles may include a head and a body.

A PTS (Presentation Time Stamp) may mean a value indicating a time when a decoded access unit is reproduced. In the present invention, the PTS may be used to synchronize a video ES with a subtitle ES.

An ES (Elementary Stream) may mean output of a data encoder. That is, outputs of a video encoder and an audio encoder may be defined as a video ES and an audio ES, respectively. In the present invention, XML subtitles ES may be defined and used.

A TS (Transport Stream) refers to a transport stream including one or several programs in an MPEG-2 system and may be used in a transport medium with transmission errors. In the present invention, the TS may mean a transport stream in which at least two of a video ES, an audio ES and a subtitle ES are multiplexed and transmitted.

FIG. 1 is a diagram showing an XML based broadcast subtitle service according to an embodiment of the present invention. FIG. 1 is a diagram showing an end-to-end system including a transmitter and a receiver for a digital broadcast service. The XML based subtitles used in the present invention is not influenced by the size of video and thus is applicable to UHD/HD/SD.

A transmitter may transmit compressed video and XML subtitles modified for transmission through a multiplexer. In addition, a receiver may demultiplex a received signal and then provide subtitles through image decoding and an XML parser. A graphics engine may modify a subtitle expression method according to the environment of the receiver and output the subtitles to a display processor. The display processor may output the decoded video and the subtitles.

In FIG. 1, the transmitter may receive video data and subtitle information. The resolution of video data input to the transmitter may be UHD, HD or SD. In addition, the subtitle information input to the transmitter may be described in XML. The video data input to the transmitter may be encoded by an encoder in the transmitter (101). The transmitter may use high efficiency video coding (HEVC) as a method of encoding video data. The transmitter may synchronize and multiplex the encoded video data and the XML subtitles using a multiplexer (102). Here, the XML subtitles may be modified for transmission. A method of modifying XML subtitles and a method of generating metadata of the XML subtitles will be described in detail below. The transmitter may perform channel coding and modulation with respect to the multiplexed synchronized data and transmit the data as a broadcast signal.

The receiver may receive the broadcast signal and perform demodulation and transport packet decoding. In addition, the receiver may demultiplex the decoded transport packet and perform video decoding and XML parsing. XML parsing may be performed through an XML parser. Here, the video decoder and the XML parser may exchange metadata. Such metadata may be used as supplementary information upon displaying the video and the subtitles. The receiver may demodulate the received broadcast signal and perform transport packet decoding (104). The decoded transport packet is input to a video decoder 106 and an XML parser 107 after passing through a demultiplexer 105. Here, the video decoder 106 may decode UHD, HD or SD video data according to the resolution of the received video data. In addition, the XML parser 107 may extract the XML subtitles. In this process, the receiver may consider image elements in display of the video data and the XML subtitles using the metadata. Here, the image element may include dynamic range, color gamut, bit depth, etc., for example. In particular, in the present invention, if a wide color gamut (WCG) and a high dynamic range (HDR) of UHD image quality elements are included in a service (e.g., DVB UHD-1 phase 2, BD UHD-FE, etc.), information on the image quality elements which are used as a subtitle production criterion may be provided to the receiver. To this end, if a subtitle production environment and a display environment are different, the receiver may appropriately modify the color or luminance of the subtitles according to the display environment. The graphics engine 108 may modify the expression method of the XML subtitles in correspondence with the above-described image elements. The decoded video data and the XML subtitles, the expression method of which is modified, may be processed and displayed by the display processor 109.

Figure 2:
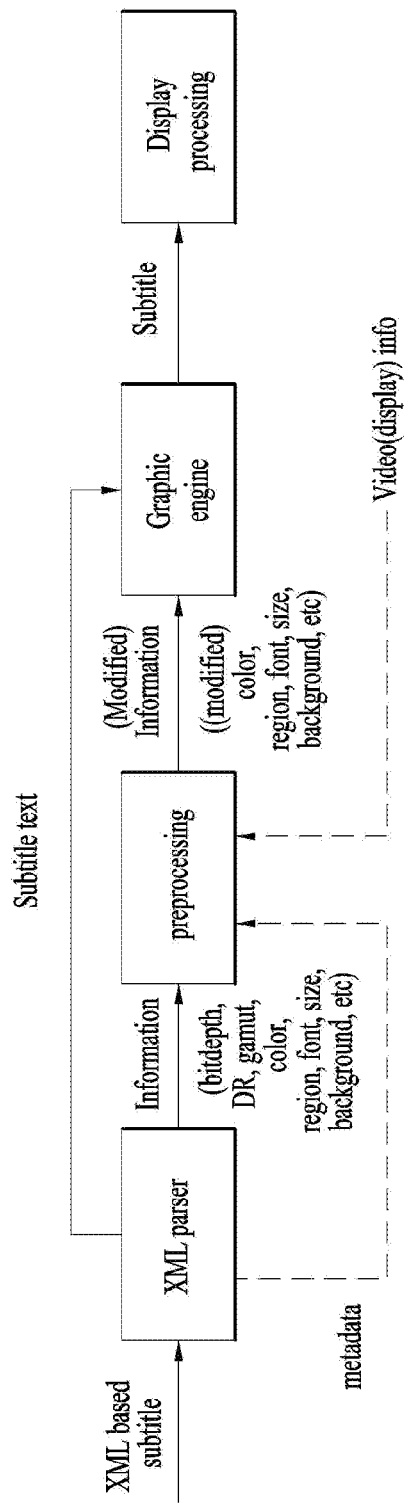
FIG. 2 is a diagram showing operation of a receiver related to XML based subtitles according to an embodiment of the present invention.

FIG. 2 is a diagram showing operation of a receiver related to XML based subtitles according to an embodiment of the present invention. The receiver may analyze content of the XML based subtitles through an XML parser. In addition, the receiver may deliver the content of the subtitles, information for expressing the subtitles and spatial information of the subtitles to a graphics engine. Here, the information for expressing the subtitles may include at least one of font, color and/or size information. In addition, the spatial information of the subtitles may include at least one of region and/or resolution information. The receiver of the present invention may perform a preprocessing procedure prior to delivery of the subtitles and information on the subtitles to the graphics engine. That is, a preprocessing procedure of detecting whether the subtitle production environment and the display environment of the receiver are different and transforming the subtitles may be performed. The receiver may deliver the subtitle information transformed through preprocessing to the graphics engine. The graphics engine may generate subtitles using the content of the subtitles or the information on the transformed subtitles and deliver the subtitles to a display processor.

Figure 3:
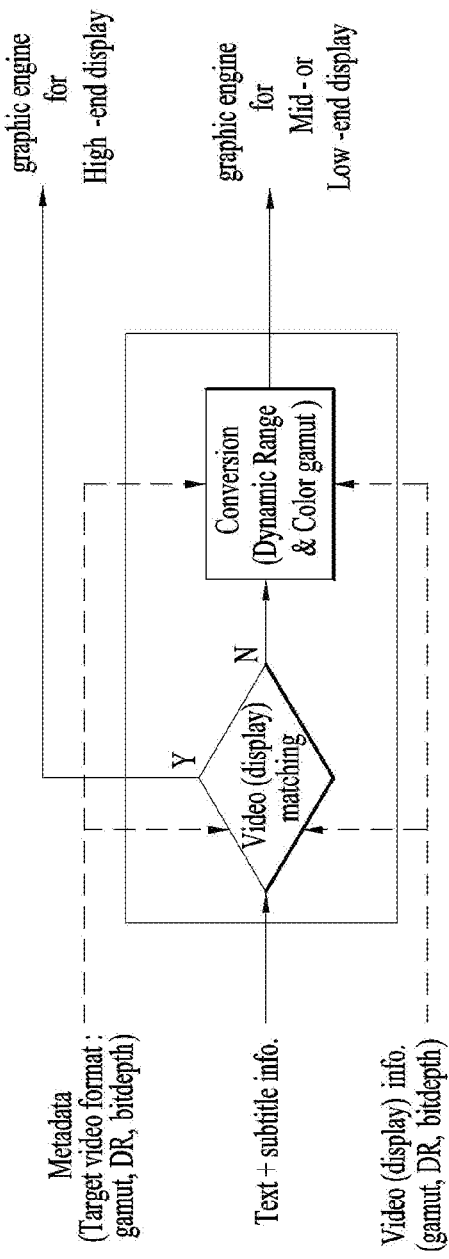
FIG. 3 is a diagram showing a preprocessing procedure of subtitles in a broadcast receiver according to an embodiment of the present invention.

FIG. 3 is a diagram showing a preprocessing procedure of subtitles in a broadcast receiver according to an embodiment of the present invention. The preprocessing procedure may include a step of detecting whether a subtitle production environment and a display environment match and a conversion step. The receiver may detect or determine whether the subtitle production environment and the display environment match based on metadata of a target video format of subtitles and metadata of a display of the receiver. The metadata of the target video format of the subtitles may include bitdepth, dynamic range and color gamut information. At this time, a determination criteria may be delivered through metadata in XML, and EBU-TT-D may be delivered to the receiver through ebuttm:RefGamut, ebuttm:RefDynamicRange, ebuttm:EOTF, ebuttm:RefBitDepth. Although the information is defined in the EBU-TT-D metadata in the above description, the same information may be defined in TTML metadata (ttm), parameter (ttp) and style (tts). That is, the elements newly defined in the present invention are applicable to XML based subtitle standards such as TTML, EBU-TT, SMPTE-TT, CFF-TT, Youview and EBU-TT. In the present invention, gamut, dynamic range and bitdepth are used as comparison criteria and resolution and aspect ratio may be used as comparison criteria if necessary. In addition, the metadata of the display of the receiver may include display environment information and may include the bitdepth, dynamic range and color gamut information of the display of the receiver.

In the matching step, if the metadata of the subtitle production environment and the metadata of the display environment match, subtitle text data and subtitle metadata are delivered to the graphics engine for high-end display. That is, if it is determined that the target video format of the subtitles matches the metadata of the display or is acceptable, the procedure progresses to a next step without processing. Here, determining that the target video format of the subtitles matches the metadata of the display or is acceptable may mean that video is HDR/WCG video or the display is an HDR/WCG display. The graphics engine may generate subtitles using the received subtitle text data and the metadata of the subtitles and deliver the generated subtitles to the display processor.

In contrast, if it is determined that the metadata of the subtitles does not match the display environment, that is, if the expression method of the subtitles needs to be converted, the preprocessing procedure may include a step of converting a subtitle expression method in terms of the color and luminance of the subtitles. In the conversion step, the subtitle expression method included in the metadata of the subtitles may be converted based on the metadata of the target video format of the subtitles and the metadata of the display of the receiver. That is, the bitdepth, dynamic range or color gamut included in the metadata of the subtitles may be converted and the modified bitdepth, modified dynamic range and modified color gamut may be delivered to the graphics engine. The transformed metadata and subtitle text may be delivered to a graphics engine for mid-end or low-end display. The graphics engine may generate subtitles based on the received subtitle text data and the transformed metadata of the subtitles and deliver the generated subtitles to the display processor. In the preprocessing procedure, each element is converted if the metadata of the subtitles and the metadata of the display differ in terms of color gamut, dynamic range or bitdepth. The conversion step is based on color gamut, dynamic range, EOTF and bitdepth information, which is reference information delivered through ebuttm:RefGamut, ebuttm:RefDynamicRange, ebuttm:EOTF and ebuttm:RefBitDepth newly defined in the metadata and (1) the difference may be ignored or (2) color gamut mapping or dynamic range mapping may be performed.

The graphics engine performs transformation for reproducing text information as video information and the receiver performs display processing with respect to the output of the graphics engine and combines the video, the subtitles and the other elements configuring the video to configure final display video.

Figure 4:
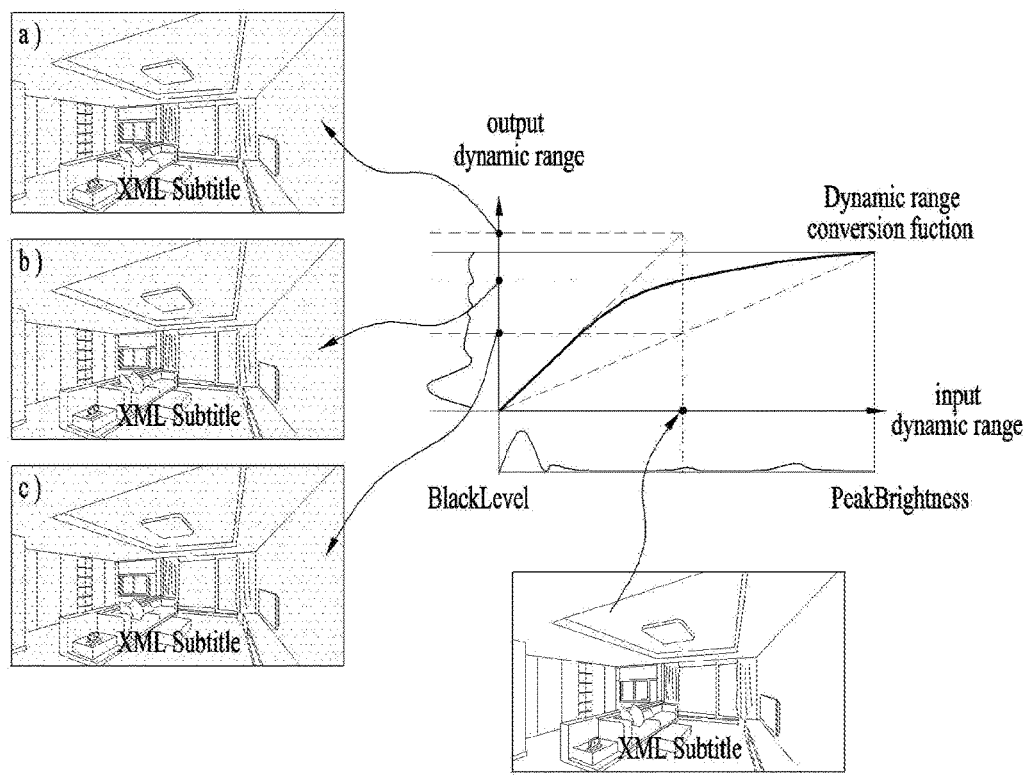
FIG. 4 is a diagram showing mapping of dynamic range to luminance according to an embodiment of the present invention.

FIG. 4 is a diagram showing mapping of a dynamic range to luminance according to an embodiment of the present invention. That is, mapping of a dynamic range to luminance of XML based subtitles is shown. More specifically, an example of a method of reproducing XML subtitles produced for HDR video in an SDR display environment is shown. If a luminance range used in the HDR video is broader than that supported by the display of the receiver, the luminance of video is changed through dynamic range mapping. At this time, if only the luminance of video is changed without considering the luminance range of the subtitles, the subtitles may not be suitable for change in luminance of the surrounding part: the luminance of the subtitles is excessively higher than that of the video as shown in a) or the luminance of the subtitles is excessively lower than that of the video as shown in c). In order to prevent this problem, the luminance value of the subtitles may be adjusted using a transformation function similar or equal to that used in video dynamic range mapping. Here, the receiver may use reference information of the luminance of the subtitles. In other words, through the method proposed by the present invention, the broadcast transmitter may insert dynamic range information of a target subtitles reproduction environment or a subtitle production environment in XML metadata. To this end, since the dynamic range information of the target subtitle reproduction environment or the subtitle production environment are included in XML metadata (ebuttm:RefDynamicRange), the receiver may perform comparison with the subtitle reproduction environment of the display, convert the subtitle expression method to luminance suitable for the environment of the receiver using suitable dynamic range mapping, and reproduce the subtitles.

In addition, the luminance range of the video and the luminance range of the subtitles may be different and, in this case, the luminance range of the subtitles needs to be converted to suit the luminance range of the video. The receiver may use ebuttm:RefDynamicRange which is reference information of the dynamic range as the reference information for determination and conversion.

If the color gamuts of the subtitle production environment and the receiver do not match, the color of the subtitles may be changed. Through a method similar to the above-described method, conversion into a color space suitable for the environment of the receiver may be performed. If the color space of the subtitle production environment or a target color space considered to reproduce the subtitles and the color space of the display do not match, the receiver may convert the color gamut of the subtitles to a displayable color gamut through the same procedure as color gamut mapping of the video. In addition, if necessary, the dynamic range mapping information or the color gamut mapping information may be delivered in the XML subtitles.

FIG. 5 is a diagram showing a method of transmitting metadata of subtitles according to an embodiment of the present invention. More specifically, an embodiment of XML subtitle metadata in EBU-TT-D is shown. The metadata of the subtitles may include information on at least one of color gamut, dynamic range, EOTF and bitdepth.

In the embodiment, reference information of the subtitles may be set and, for example, the color gamut may be set to BT.2020, the dynamic range may be set to 0.0001 nits to 2000 nits, and the bitdepth may be set to 12 bits.

More specifically, the XML subtitle metadata may include color gamut information of the subtitles. The XML subtitle metadata may include ebuttm:RefGamut="BT2020", which may mean that the color gamut of the subtitles is set to BT2020.

More specifically, the XML subtitle metadata may include dynamic range information of the subtitles. The XML subtitle metadata may include ebuttm:RefDynamicRange=2000 100 200000, which may mean that the dynamic range of the subtitles is set to minimum luminance of 0.01 and maximum luminance of 2000 nits. Here, 200000 may mean a ratio of the minimum luminance to the maximum luminance. A detailed description thereof will be given below.

More specifically, the XML subtitle metadata may include Electro-Optical Transfer Function (EOTF) information of the subtitles. The XML subtitle metadata may include ebuttm:EOTF="SMPTE2084", which may mean that the EOTF of the subtitles is set to SMPTE2084.

More specifically, the XML subtitle metadata may include bitdepth information of the subtitles. The XML subtitle metadata may include ebuttm:RefBitDepth=12, which may mean that the bitdepth of the subtitles is set to 12 bits. In addition, the XML subtitle metadata may include ebutts:colorExtent="0F040A" and ebutts:backgroundColorExtent="010803" to additionally set the extension field of the colors of the subtitles and the background. That is, the metadata may be set to the colors of the subtitles and the background to <tt:style xml:id="BaseStyle" tts:color="red", ebutts:colorExtent="0F040A" tts:backgroundColor="yellow" ebutts:backgroundColorExtent="010803" . . . I>. To this end, the color of the subtitles is red and the color of the background is yellow in the 8-bit based receiver, and the subtitles having the color of red=0x0FFF, green=0x0004 and blue=0x000A are represented in the 12-bit based receiver. In addition, the color of the background is yellow in the 8-bit based receiver and is red=0xoFF1, green=0x0FF8 and blue=0x003 in the 12-bit based receiver.

The metadata of the subtitles of the present invention is applicable to EBU-TT-D as described above and is also applicable to XML based subtitle standards such as TTML, SMPTE-TT, CFF-TT, Youview and EBU-TT using a similar method.

FIG. 6 is a diagram showing a detailed description of elements of metadata of subtitles according to an embodiment of the present invention. (a) shows a color gamut field. ebuttm:RefGamut included in the metadata indicates the color gamut field considered upon producing the subtitles and may be specified to an existing color gamut such as BT.709 or BT.2020 as shown in the figure. In addition, ebuttm:RefGamut may provide information on an arbitrary color gamut by directly specifying CIExy coordinates. In the case of the arbitrary color gamut, CIExy coordinates (xRed, yRed, xGreen, yGreen, xBlue, yBlue, xWhite, yWhite) of red, green, blue and white points may be delivered. Here, a value corresponding to 10000 times an original coordinate value is delivered according to value=originalValue *10000. If an existing color gamut is used, BT709 or BT2020 attributes may be predefined and used and, as shown in the figure, it is indicated that the color gamut is BT2020 using the <namedGamut> attribute. The color gamut field may be used as information for determining whether the color gamuts of the subtitle production environment and the display environment (or video) match and, if necessary, information for color gamut mapping.

(b) shows a dynamic range field. The dynamic range field is an element indicating the dynamic range of the video considered upon producing the subtitles. The dynamic range field may include PeakBrightness, BlackLevel and ContrastRatio respectively indicating maximum luminance, minimum luminance and contrast ratio of the dynamic range. At this time, the ContrastRatio may indicate a ratio of maximum luminance to minimum luminance and may have a value of 10,000 in the case of 10,000:1, for example. The PeakBrightness and the BlackLevel are expressed in nits (cd/m^2), and BlackLevel may have a value corresponding to BlackLevel=OriginalValue *10000 in consideration of BlackLevel of 1 or less.

If there is a standardized dynamic range such as HD, for example, an SMPTE reference HDTV standard may be utilized using a <namedDynamicRange> attribute as shown in the figure. If a future HDR standard is released, a standardized dynamic range may be defined and used in a namedDynamicRange. The dynamic range field may be used as information for determining whether the dynamic ranges of the subtitle production environment and the display environment (or video) match and, if necessary, information for dynamic range mapping.

The color gamut and the dynamic range may be used to provide information on the subtitle production environment or to provide the color gamut and dynamic range information of target video/display.

(c) shows an EOTF field. The EOTF field may deliver EOTF information used in association with the dynamic range. The EOTF field may deliver existing EOTF information such as BT.1886 or SMPTE 2084. Although SMPTE 2084 is used in the above-described embodiment, the EOTF element may be used to deliver an arbitrary EOTF. The EOTF field may be used for luminance linearization prior to dynamic range mapping.

FIG. 7 is a diagram showing a detailed description of elements of metadata of subtitles according to an embodiment of the present invention. (a) shows a bitdepth field. An UHD broadcast transmitter may transmit a service based on a bitdepth of 8 bits or more in order to provide improved image quality. For example, a 10-bit based service will be provided in DVB UHD-1 phase 1 and a service based on at least 10 bits may be provided in UHD-1 phase 2, to which image quality elements such as WCG and HDR are added. Even in next-generation storage media such as BD UHD-FE or SCSA, a bitdepth of 10 bits or more may be similarly considered. However, in the EBU-TT-D standard, the expression method is restricted to 8 bits. Accordingly, there is a need for a method of defining new bitdepth expression or a method of extending and expressing a bitdepth while maintaining an existing system. In the present invention, the method of extending and expressing the bitdepth while maintaining the existing system will be described.

As shown in (a), in the present invention, the metadata of the subtitles may represent a maximum bitdepth capable of being provided by the subtitle system through ebuttm: RefBitDepth. The bitdepth may indicate the number of bits of the information expressing the color. The range of the bitdepth may be from 8 to 16. For example, the bitdepth may be set to 8, 10, 12 or 16. If a rich color such as logo is not expressed, simple subtitles are used and, if a pallet having a subtitle color is restricted to dithering, etc., a bitdepth of 8 or less may be used. That is, using this element, information on the pallet used in the subtitles may be delivered.

This field may be used as a criterion for comparing the bitdepth of the subtitles and the bitdepth of the receiver or video in the preprocessing procedure. In addition, this field may be used to inform the receiver that a bitdepth of 8 bits or more is used or for the receiver to detect that a bitdepth of 8 bits or more is used. If ebuttm:RefBitDepth is used and has a value of 9 or more, the color may be expressed using tts:color and ebuttds:colorExtent.

If it is necessary to support a high bitdepth for UHD with respect to an EBU-TT-D based subtitle service, that is, if ebuttm:RefBitDepth is set to a value of 9 or more in the present invention, an existing color expression method needs to be extended. In EBU-TT-D, the color is defined using tts:color and, as shown in (b), the colors of red, green, and blue (and alpha) may be expressed using an 8-bit bitdepth through the color expression method defined in <ebuttdt:distributionColorType>. As a method of extending the existing 8-bit based color expression method, as shown in (c), a method of further defining an extension field may be used. That is, the higher 8 bits of the colors of red, green and blue (and alpha) representable by the bitdepth may be represented through tts:color and lower bits except for the higher 8 bits may be represented through ebuttds:colorExtent. To this end, a receiver implemented based on EBU-TT-D ver. 1, that is, a legacy receiver or a HD receiver or fewer, which does not require a bitdepth of 8 bits or more, 8-bit base color information may be interpreted through tts:color. In addition, in a UHD receiver, 8-bit base color information may be interpreted through tts:color and a high depth exceeding 8 bits may be interpreted through ebutts:colorExtent.

The extension field may be expressed using the existing expression method without change, and, at this time, the lower bits except for the higher 8 bits defined in ebuttm:RefBitDepth are expressed using 8 bits. An embodiment thereof was described above.

FIG. 8 is a diagram showing an additional description of elements of metadata of subtitles according to an embodiment of the present invention. In EBU-TT, SMPTE-TT and TTML, the color may be expressed using rgb (r-value, g-value, b-value) along with #rrggbb. (a) shows an example of metadata expression of the color of the subtitles in TTML and EBU-TT may define color expression using <ebuttdt:colorType> with respect to the same method.

In this case, in order to represent the extended bitdepth, like the above-described embodiment, a method of defining an extension field "tts:colorExtent" may be used. (b) and (c) are embodiments of defining tts:colorExtent in TTML. However, since the extension field does not have an independent meaning, <namedColor> may not be used. As described above, in the case of EBU-TT, the extension field may be defined by <ebuttdt:colorTypeExtension>. For example, in a 12-bit based receiver, when the subtitles having the color of red=0x0FFF, green=0x0004, blue=0x000A are expressed, higher 8 bits of 12 bits may be represented using the existing color expression method and the lower 4 bits may be represented using the extension field.

That is, the higher 8 bits may be represented using tts:color and the lower 4 bits may be represented using tts:colorExtent.

In the metadata of the subtitles according to the embodiment of the present invention, the extension field may be added to extend the color gamut and express subtitles having various colors, while maintaining the existing color expression method.

Figure 9:
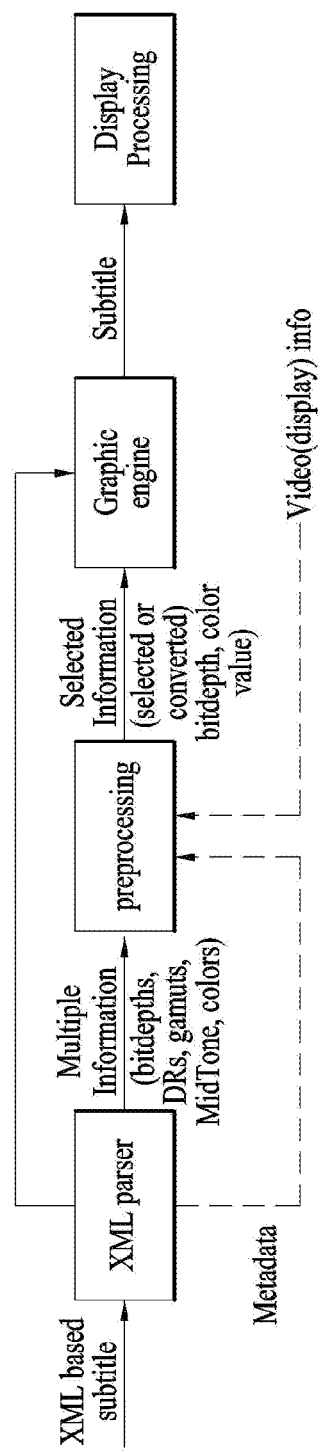
FIG. 9 is a diagram showing operation of a receiver related to XML based subtitles according to an embodiment of the present invention.

FIG. 9 is a diagram showing operation of a receiver related to XML based subtitles according to an embodiment of the present invention. In the present invention, the structure of a receiver capable of providing a subtitle service suitable for the environment of the receiver based on a single subtitle when services having different image qualities are provided to the same content like DVB UHD-1 phase 1 and phase 2 will be described. In addition, a receiver having a structure similar to that of the above-described receiver may be used even in an IP streaming based service for adaptively providing different image qualities according to transmission environments or a storage media based image service for providing different services according to environments of receivers. Examples of the IP streaming based service capable of adaptively providing different image qualities according to transmission environments include a MPEG-dynamic adaptive streaming over HTTP (DASH).

The receiver may analyze content of the XML based subtitles through an XML parser. In addition, the receiver may deliver the content of the subtitles and information for expressing the subtitles to a graphics engine. Here, the information for expressing the subtitles may include elements for identifying the image qualities of the content. That is, the information for expressing the subtitles may include at least one of bitdepth, dynamic range, color gamut, Mid-Tone and/or colors.

The receiver of the present invention may perform a preprocessing procedure prior to delivery of the subtitles and information on the subtitles to the graphics engine. The receiver may select the color, luminance or bitdepth information of the subtitles according to receivable service type or convert (transform) and use the above-described information based on the information of the subtitles.

The receiver may deliver the information on the subtitles selected or transformed through the preprocessing procedure to the graphics engine. The graphics engine may generate subtitles using the content of the subtitles or the information on the transformed subtitles and deliver the subtitles to a display processor.

Figure 10:
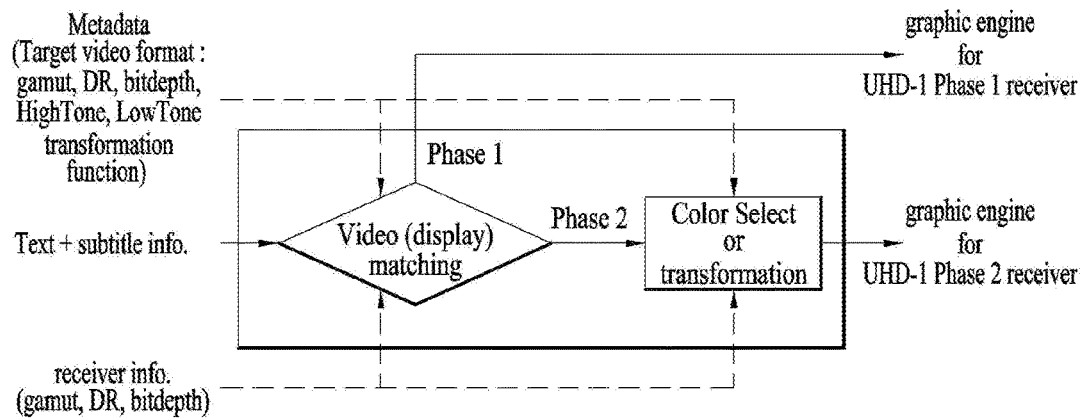
FIG. 10 is a diagram showing a preprocessing procedure of subtitles in a broadcast receiver according to an embodiment of the present invention.

FIG. 10 is a diagram showing a preprocessing procedure of subtitles in a broadcast receiver according to an embodiment of the present invention. The preprocessing procedure performed when received subtitles supports both DVB UHD-1 phases 1 and 2 is shown. The preprocessing procedure may include a step of detecting whether a subtitle production environment and a display environment match and a selection or transformation step. The receiver may detect or determine whether the subtitle production environment and the display environment match based on metadata of a target video format of subtitles and metadata of a display of the receiver. The metadata of the target video format of the subtitles may include bitdepth, dynamic range, color gamut, HighTone or LowTone as subtitles luminance reference value and transformation function information. At this time, a determination criteria may be delivered through metadata in XML, and, in the case of EBU-TT-D, the base image quality elements of the subtitles may be delivered to the receiver through ebuttm:Gamut, ebuttm:DynamicRange, ebuttm:EOTF, and ebuttm:BitDepth. The supplementarily supported image quality elements of the subtitles may be delivered to the receiver through ebuttm: SupplementaryGamut, ebuttm: SupplementaryDynamicRange, ebuttm: SupplementaryEOTF, and ebuttm: SupplementaryBitDepth. Alternatively, the base image quality elements or supplementarily supported image quality elements of the subtitles may be delivered together through ebuttm:Gamuts, ebuttm:DynamicRanges, ebuttm:EOTFs, and ebuttm:BitDepths. Although the information is defined in the EBU-TT-D metadata in the above description, the same information may be defined in TTML metadata (ttm), parameter (ttp) and style (tts). That is, the elements newly defined in the present invention are applicable to XML based subtitle standards such as TTML, EBU-TT, SMPTE-TT, CFF-TT, Youview and EBU-TT. In the present invention, gamut, dynamic range and bitdepth are used as comparison criteria and resolution and aspect ratio may be used as comparison criteria if necessary. In addition, the metadata of the display of the receiver may include display environment information and may include the bitdepth, dynamic range and color gamut information of the display of the receiver.

In the matching step, if the metadata of the subtitle production environment and the metadata of the display environment match, the text data and metadata of the subtitles are delivered to the graphics engine for a UHD-1 Phase 1 receiver. That is, if it is determined that the target video format of the subtitles received by the UHD-1 Phase 1 receiver matches the metadata of the display, the procedure progresses to a next step without separate processing. The graphics engine may generate subtitles using the received text data and metadata of the subtitles and deliver the generated subtitles to the display processor.

In contrast, if it is determined that the metadata of the subtitles does not match the display environment, that is, if the expression method of the subtitles needs to be selected or transformed, the preprocessing procedure may include a step of selecting a different subtitle expression method in terms of the color and luminance of the subtitles or transforming a subtitle expression method. In the selection or transformation step, the subtitle expression method included in the metadata of the subtitles may be selected or transformed based on the metadata of the target video format of the subtitles and the metadata of the display of the receiver. The selection step may be performed if the metadata of the subtitles includes a plurality of subtitle expression methods. That is, the receiver may select any one of a plurality of expression methods including bitdepth, dynamic range or color gamut included in the metadata of the subtitles to suit the metadata of the receiver. That is, the bitdepth, dynamic range or color gamut included in the metadata of the subtitles may be selected or transformed and the selected bitdepth, selected dynamic range and selected color gamut may be delivered to the graphics engine or the transformed bitdepth, transformed dynamic range and transformed color gamut may be delivered to the graphics engine. The transformed or selected metadata and subtitle text may be delivered to a graphics engine for a UHD-1 Phase 2 receiver. The graphics engine may generate subtitles based on the received subtitle text data and the selected or transformed metadata of the subtitles and deliver the generated subtitles to the display processor. In the preprocessing procedure, each element is selected or transformed if the metadata of the subtitles and the metadata of the display differ in terms of color gamut, dynamic range or bitdepth.

The graphics engine performs transformation for reproducing text information as video information and the receiver performs display processing with respect to the output of the graphics engine and combines the video, the subtitles and the other elements configuring the video to configure final display video.

The capabilities supported by the subtitles delivered by the present invention are compared with the capabilities of the receiver and then appropriate values of the color gamut, dynamic range and bitdepth are selected and used according to suitable format. At this time, comparison and selection may be performed based on the base color gamut, dynamic range, EOTF and bitdepth information delivered through ebuttm:Gamut, ebuttm:DynamicRange, ebuttm:EOTF and ebuttm:BitDepth and the supplementary color gamut, dynamic range, EOTF and bitdepth delivered through ebuttm:SupplementaryGamut, ebuttm: SupplementaryDynamicRange, ebuttm: SupplementaryEOTF and ebuttm:SupplementaryBitDepth. In addition, as another embodiment, comparison and selection may be performed based on the color gamut, dynamic range, EOTF and bitdepth information delivered through ebuttm: Gamuts, ebuttm:DynamicRanges, ebuttm:EOTFs and ebuttm:BitDepths including the base information and the supplementary information. The receiver may perform color gamut transformation or dynamic range transformation (1) if a difference between expression information is ignored, (2) if a value suitable for a given format is selected based on information in metadata or (3) if a transformation function for expression information is given. Hereinafter, a method of selecting expression information in the case of (2) will be described and a method of transforming expression information and, more particularly, dynamic range in the case of (3) will be described.

Figure 11:
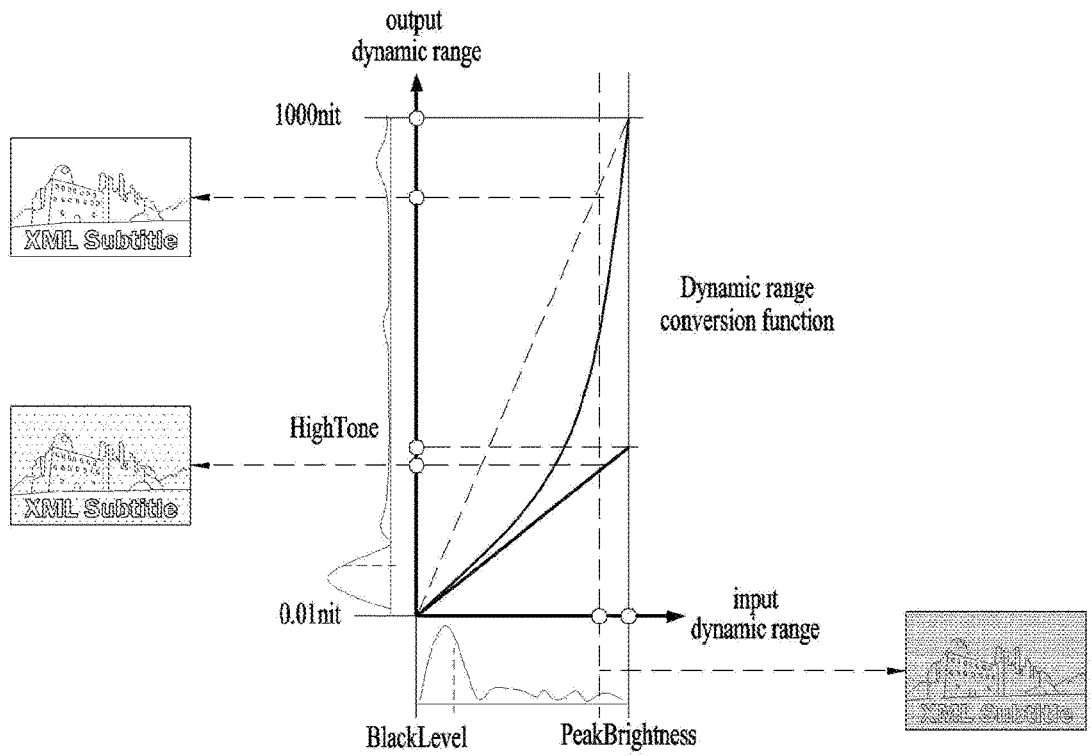
FIG. 11 is a diagram showing mapping of dynamic range to luminance according to an embodiment of the present invention.

FIG. 11 is a diagram showing mapping of a dynamic range to luminance according to an embodiment of the present invention. That is, mapping of a dynamic range to luminance of XML based subtitles is shown. That is, XML subtitles produced for SDR video is reproduced on an HDR display of a receiver. In this case, the luminance of the video is changed through dynamic range mapping. At this time, if the luminance of the subtitles is changed equally to the video without considering the luminance range of the video, the subtitles may be brighter than necessary. For example, the maximum luminance of the HDR video may be set to a very high value in order to express dazzling effects like highlighting. If the luminance of subtitles set to a maximum value in the SDR video is equally set to a maximum value even in the HDR video, the subtitles may be brighter than necessary.

In order to prevent this problem, appropriate subtitle luminance in a target image luminance range may be set and delivered upon encoding or a subtitle luminance reference value (HighTone and LowTone) may be delivered in metadata and subtitle luminance transformation for the HDR video may be performed within the reference luminance. For example, HighTone may be understood as appropriate maximum luminance in the given luminance range. Upon dynamic range transformation, luminance may not be changed based on the peak brightness of the dynamic range of the video or the peak brightness of the dynamic range supported by a target receiver, but the dynamic range of the subtitles may be changed based on HighTone. That is, a threshold of the luminance of the subtitles may be set. Similarly, LowTone may be appropriate minimum luminance in the given luminance range. At this time, HighTone and LowTone may be given in nits and the receiver may perform dynamic range mapping of the subtitles based on given information, independently of the luminance of the video. At this time, since the luminance range of the HDR video and the luminance range of the subtitles are different, the luminance range of the video needs to be expressed as a digital value upon transformation of the luminance/color of the subtitles.

FIG. 12 is a diagram showing metadata including information on subtitles according to another embodiment of the present invention. That is, an embodiment of subtitle metadata proposed by the present invention is represented with respect to EBU-TT-D. More specifically, the shown metadata has color gamut of BT.709, minimum luminance of 0.05 nits, maximum luminance of 100 nits and Bitdepth of 8 bits, for UHD phase 1, and has color gamut of BT.2020, minimum luminance of 0.01 nits, maximum luminance of 2000 nits and Bitdepth of 12 bits, for phase 2.

The metadata of the subtitles may include color gamut, dynamic range, EOTF, and bitdepth information. The metadata of the subtitles may support a phased access method of image quality like UHD phases 1 & 2. The metadata of the subtitles may include base color gamut, base dynamic range, base EOTF and base bitdepth information as a method of indicating the support ranges of UHD phase 1 and phase 2. For example, the metadata of the subtitles may include ebuttm:Gamut="BT709", ebuttm:DynamicRange=100 500 2000, ebuttm:EOTF="BT1886", and ebuttm:BitDepth=8 as base information. The meanings of the information were described above.

In addition, the metadata of the subtitles may include supplementary color gamut, supplementary dynamic range, supplementary EOTF and supplementary bitdepth information as supplementary information indicating information supported in the case of highest image quality through a scalable approach. For example, the metadata of the subtitles may include ebuttm:SupplementaryGamut="BT2020", ebuttm:SupplementaryDynamicRange=2000 100 200000 500 100, ebuttm:SupplementaryEOTF="SMPTE2084" and ebuttm:SupplementaryBitDepth=12 as supplementary information. This may indicate that the maximum luminance of target video is 2,000 nits, minimum luminance thereof is 0.01 nits, contrast ratio thereof is 200,000:1, appropriate subtitle maximum luminance thereof is 500 nits and minimum luminance thereof is 0.01 nits.

In addition, for the color of the subtitles, tts:color="rrggbb" may be included as base information and tts:colorSupplementary="#RRRGGGBBB" may be included as supplementary information. In addition, tts:backgroundColor="r'r'g'g'b'b'" may be included as base information of the background color of the subtitles and tts:backgroundColorSupplementary="#–R'R'R'G'G'G'B'B'" may be included as supplementary information of the background color of the subtitles. The metadata in which the base information and the supplementary information of the subtitle expression method are defined through different fields may be delivered to the receiver.

FIG. 13 is a diagram showing metadata including information on a subtitle according to another embodiment of the present invention. That is, an embodiment of subtitle metadata proposed by the present invention is represented with respect to EBU-TT-D. More specifically, the shown metadata has color gamut of BT.709, minimum luminance of 0.05 nits, maximum luminance of 100 nits and Bitdepth of 8 bits, for UHD phase 1, and has color gamut of BT.2020, minimum luminance of 0.01 nits, maximum luminance of 2000 nits and Bitdepth of 12 bits, for phase 2.

The metadata of the subtitle may include color gamut, dynamic range, EOTF and bitdepth information. The metadata of the subtitle may support a phased access method of image quality like UHD phases 1 & 2. The metadata of the subtitle may include color gamut, dynamic range, EOTF and bitdepth information having a plurality of attributes as a method of indicating the support ranges of UHD phase 1 and phase 2. For example, the metadata of the subtitle may include information such as ebuttm:Gamuts="BT709" "BT2020", ebuttm:DynamicRanges=100 500 2000 2000 100 200000 500 100, ebuttm:EOTFs="BT1886" "SMPTE2084", ebuttm:BitDepths=8 10 12, ebuttm:ColorTransformation="video" "function" "linear" 500 as expression information. Here, ebuttm:ColorTransformation may represent an example in which the metadata provides a color transformation method. As described above, each information may have two values supporting phases and the meanings of the information were described above. Such metadata in which a subtitle expression method is defined using information fields having a plurality of attributes in order to support UHD phase 1 and phase 2 may be delivered to the receiver. Such a metadata generation method is applicable to XML based subtitle standards such as TTML, SMPTE-TT, CFF-TT, Youview and EBU-TT.

FIG. 14 is a diagram showing a detailed description of elements of metadata of subtitles according to an embodiment of the present invention. (a) and (b) show color gamut fields. The metadata of the subtitles may respectively indicate the base color gamut and supplementarily supportable color gamut of the subtitles in ebuttm:Gamut and ebuttm:SupplementaryGamut elements as shown in (a). The attributes of the elements may provide information on an arbitrary color gamut by specifying a well-known color gamut such as BT.709 or BT.2020 or directly specifying CIExy coordinates. In the case of the arbitrary color gamut, the metadata of the subtitles may deliver CIExy coordinates (xRed, yRed, xGreen, yGreen, xBlue, yBlue, xWhite and yWhite) of red, green, blue and white points as shown in the figure. At this time, a value corresponding to 10000 times an original coordinate value is delivered according to value=originalValue *10000. If an existing color gamut is used, the metadata of the subtitles may use predefined BT709 or BT2020 attributes as shown in the figure. In the embodiment, in addition to BT. 709, supplementarily supportable BT.2020 is expressed using <namedGamut> attribute. This field may be used as information for determining whether the color gamuts of the subtitle production environment and the display environment (or image) match, information for determining a service supported by the subtitles and, if necessary, information for color gamut mapping.

The metadata of the subtitles may indicate a reference color gamut which is one type of expression information of the subtitles and a supplementarily supportable color gamut in one element as shown in (b). Here, the reference attribute will be described first and then the supplementarily supportable attribute will be described.

FIG. 15 is a diagram showing a detailed description of elements of metadata of subtitles according to an embodiment of the present invention. (a) and (b) show dynamic range. The metadata may use ebuttm:DynamicRange and ebuttm:AuxiliaryDynamicRange elements as shown in (a) in order to represent a base dynamic range and a supplementarily supported dynamic range considered in the subtitles. In the attributes of the elements, maximum luminance, minimum luminance and contrast ratio of the dynamic range may be represented by PeakBrightness, BlackLevel and ContrastRatio. In addition, the metadata may include HighTone and LowTone attributes indicating the maximum luminance and minimum luminance suitable for the subtitles, which are criteria for processing the dynamic range independent of video. At this time, ContrastRatio may indicate a ratio of maximum luminance to minimum luminance and may deliver a value of 10,000 in the case of 10,000:1, for example. The remaining values may deliver a value corresponding to BlackLevel=OriginalValue *10000 in nits (cd/m^2) in consideration of BlackLevel (and LowTone) of 1 or less.

If there is a standardized dynamic range like HD, for example, an SMPTE reference HDTV standard may be specified and used as a namedDynamicRange value as follows. A future HDR standard may be defined and then used in a namedDynamicRange. This field may be used as information for determining whether the dynamic ranges of the subtitle production environment and the display environment (or video) match and, if necessary, information for dynamic range mapping.

As another embodiment, as shown in (b), a reference dynamic range and a supplementarily supportable dynamic range may be indicated in one element. That is, ebuttm:DynamicRanges includes attributes such as PeakBrightness, BlackLevel, ContrastRatio, PeakBrightness2, BlackLevel2, ContrastRatio2, HighTone, and LowTone. Even in this embodiment, the independent dynamic range of the subtitles may be supplementarily described using HighTone and LowTone. Although an example of delivering HighTone and LowTone in ebuttm:ColorTransformation has been described in the above embodiment, information on HighTone and LowTone may be defined in the metadata as separate elements or may be defined in parts related to the dynamic range, e.g., ebuttm:DynamicRanges, ebuttm:SupplementaryDynamicRange, etc. Even in the embodiment of (b), as described above, PeakBrightness, BlackLevel and ContrastRatio may use values defined in the namedDynamicRange. In addition, PeakBrightness2, BlackLevel2 and ContrastRatio2 may also be defined and used in the namedDynamicRange.

FIG. 16 is a diagram showing a detailed description of elements of metadata of subtitles according to an embodiment of the present invention. (a) shows an EOTF field and (b) shows a BitDepth field.

The metadata may deliver information on a supplementary EOTF through ebuttm:SupplementaryEOTF along with ebuttm:EOTF which is information on a base EOTF if a used EOTF varies according to dynamic range. Alternatively, information on two EOTFs may be combined and delivered in one element through Ebuttm:EOTFs, and, in this case, a preceding element is a base element. In either case, like BT.1886 or SMPTE 2084, existing EOTF information may be defined and used in a namedEOTF. This field may be used for luminance linearization prior to dynamic range mapping.

The metadata may represent bitdepths through ebuttm:BitDepth and ebuttm:SupplementaryBitDepth if different bitdepths are supported according to broadcast service. Like a previous example, a base information element and a supplementary information element may be used or supported bitdepths may be simultaneously represented using Ebuttm:BitDepths. In this case, a base element precedes the supplementary information. This field may be used as a criterion for comparing the bitdepth of the subtitles and the bitdepth of the receiver or video or may be used to indicate or detect that a bitdepth of 8 bits or more is used in the received subtitles. If ebuttm:RefBitDepth is used and has a value of 9 or more, the metadata may express a color using a newly defined color expression method.

As described above, when the metadata of the subtitles delivered through the present invention is used, the receiver may compare the video elements supported by the subtitles and the video element supported by the receiver through ebuttm: Gamut, ebuttm:DynamicRange, ebuttm:EOTF and ebuttm:BitDepth as base information of image property metadata, ebuttm: SupplementaryGamut, ebuttm: SupplementaryDynamicRange, ebuttm: SupplementaryEOTF, ebuttm: SupplementaryBitDepth as supplementary information, and ebuttm: Gamuts, ebuttm:DynamicRanges, ebuttm:EOTFs and ebuttm:BitDepths including both base and supplementary information. In addition, it is determined that the receiver uses supplementarily supported elements, appropriates values of the color gamut, the dynamic range and the bitdepth may be selected and used according to a suitable format.

In addition, the receiver may represent image properties supported by the subtitles based on the information included in the metadata and represent actual color expression values with respect to a plurality of properties. Here, the luminance and bit depth may be included in color expression. Since it is assumed that the XML subtitles described in the present invention are backward compatible, there is a need for a method of expressing information on the subtitles using a method which may be processed in both an old receiver and a new receiver. Hereinafter, the method of expressing the color of the subtitles will be described.

FIG. 17 is a diagram showing a method of expressing the color of subtitles according to an embodiment of the present invention. (a) shows a method of expressing the color of the subtitles using a named color value. Although, in the XML subtitles, the color is basically expressed in hexadecimal, well-known colors may be expressed by the names of the colors. For example, red is 8-bit RGB and may be expressed by #FF0000 or "red". At this time, if a specific color has different digital values in different color gamuts, different colors may be expressed with respect to one digital value. However, if the name of the color is expressed, the same color may be expressed even in different color gamuts. For example, as shown in the figure, if a named color "red" is expressed, a receiver using BT. 709 may interpret the named color as a value of #FF0000 and a receiver using BT.2020 may interpret the named color as a value of #C80000. Such mapping of the named color may be predefined in the standard.

(b) shows a case of delivering a matching color value. The receiver may directly deliver color values expressing supplementary image properties supported by the XML subtitles. That is, like tts:color, in the existing EBU-TT-D, etc. the color expression method may be used without change and the color values of the supplementarily supported color gamut, dynamic range and bit depth may be delivered through tts:colorSupplementary. At this time, an existing receiver interprets only interpretable tts:color and a receiver capable of interpreting and supporting a supplementary color gamut (and bitdepth) uses colors expressed in tts:colorSupplementary. At this time, a high bit depth may be used in the case of the supplementrarily supported color gamut, dynamic range, etc. For example, if a color expression method of 12 bits or 16 bits is used, as shown in the figure, <ebuttdt:distributionColorTypeExtension12> or <ebuttdt:distributionColorTypeExtension16> may be defined.

FIG. 18 is a diagram showing a method of expressing the color of subtitles according to another embodiment of the present invention. Although the metadata of the subtitles directly delivers values corresponding to supplementarily supported elements in the above-described embodiment, a difference from a base value may be delivered through supplementary information. That is, as the concept of delivering diff satisfying "•Supplementary color=base color+ diff", in order to represent the sign and size of the difference value, a color different type may be defined as shown in the figure. That is, in order to deliver a difference between tts:colorSupplementary and a supported color expression value, an example of the expression method using <ebuttdt: distributionColorDifferenceTypeExtension12> or <ebuttdt: distributionColorDifferenceTypeExtension16> may be indicated. The difference information may include the sign and size of the difference value and the receiver may add or subtract the difference information to or from the base information, thereby acquiring information on the extended colors.

FIG. 19 is a diagram showing a method of expressing the color of subtitles according to another embodiment of the present invention. The metadata may directly deliver values corresponding to supplementarily supported services as in the above-described embodiment or provide information on the method of transforming the base color to directly deliver colors. In the present invention, this method may be referred to as a transformation method or a conversion method. The conversion method may implement the color of the subtitles to suit the receiver based on the color gamut, dynamic range and bitdepth of the target service of the metadata and HighTone and LowTone which are the luminance range of the subtitles. Alternatively, if video provides a scalable approach and the base and target of video and the base and target provided by the subtitles match, the conversion method of video may be used. The present invention may describe a method of providing a subtitle service having constant quality at receivers if the types of video and the considered service are different or if conversion capabilities of video and receiver are different. In the present invention, ebuttm:ColorTransformation may be used.

As an embodiment of ebuttm:ColorTransformation, the following may be considered. The metadata of the subtitles may deliver information related to color gamut scalability and information related to dynamic range scalability as color transformation. As a method of supporting this, (1) a method of using a transformation function of video, (2) a method of enabling a receiver to autonomously perform transformation through HighTone and LowTone information without a separate transformation function, (3) a method of delivering an LUT and (4) a method of delivering a transformation function may be used. In Method (1), "video" may be expressed in ebuttm:ColorTransformation and, if transformation of video is borrowed, supplementary information specially delivered in the metadata may not be necessary. In Method (2), "tone" may be expressed in ebuttm:ColorTransformation and luminance transformation preferred by the receiver may be used through appropriate subtitle luminance (HighTone, LowTone) delivered through the metadata. At this time, linear mapping may be the default. In Method (3), "LUT" may be expressed in ebuttm:ColorTransformation and a value corresponding to input/output of mapping may be delivered. In Method (4), "function" may be expressed in ebuttm:ColorTransformation, a separate transformation function may be used and the metadata may include the type of the function and coefficients. In the case of the LUT for color gamut transformation, ebuttm:ColorTransformation may deliver a value for RGB-to-RGB transformation and, if a separate transformation function is given, the coefficients of a transformation matrix may be delivered. Dynamic range transformation is considered based on change in Y value, a given transformation function may be divided into linear, exponential, piecewise linear, log and s-curve functions, and the metadata may deliver coefficients necessary for each function. At this time, an appropriate luminance range for subtitle transformation is necessary and HighTone and LowTone may be delivered in ebuttm:ColorTransformation. In addition, HighTone and LowTone may be defined in the metadata as separate elements or in parts related to the dynamic range, that is, ebuttm:DynamicRanges and ebuttm: SupplementaryDynamicRange.

Although color gamut scaling and dynamic range scaling information are separately delivered in this embodiment, transformation from BT.709+SDR to BT.709+HDR, BT.2020+SDR or BT.2020+HDR may be combined and delivered as one function.

FIG. 20 is a block diagram showing a broadcast transmitter according to an embodiment of the present invention. The broadcast transmitter 1701 according to the present invention may include an encoder 1702, a multiplexer 1703 and/or a transmission unit 1704.

The resolution of video data input to the broadcast receiver 1701 may be UHD, HD or SD. In addition, subtitle information input to the broadcast receiver 1701 may be described in XML. The video data input to the broadcast receiver 1701 may be encoded by the encoder 1702. A transmitter may use high efficiency video coding (HEVC) as an encoding method of the video data. The transmitter may synchronize and multiplex the encoded video data and XML subtitles using the multiplexer 1703. Here, the XML subtitles may include metadata of the subtitles as described above and may include information on the color gamut, dynamic range, EOTF and bitdepth of the subtitles.

As another embodiment, here, the XML subtitles may include the metadata of the subtitle as described above and may include information on the color gamut, dynamic range, EOTF and/or bitdepth of the subtitle. In addition, the metadata of the subtitles may include subtitle expression information corresponding to the service supporting different color gamuts, dynamic ranges, EOTFs and bitdepths and may include a plurality of values with respect to the same information, thereby enabling each receiver to selectively determine the subtitle expression information according to supportable service. In addition, in some embodiments, the subtitle expression information may include base information and a transformation function such that the base information may be used without transformation or transformed according to receiver.

The transmission unit 1704 may transmit a transport stream output from the multiplexer 1703 as a broadcast signal. Here, the transport stream may be subjected to channel coding and modulation and then transmitted as the broadcast signal.

Figure 21:
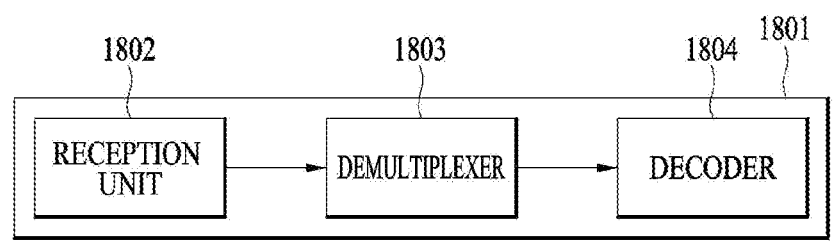
FIG. 21 is a block diagram showing a broadcast receiver according to an embodiment of the present invention.

FIG. 21 is a block diagram showing a broadcast receiver according to an embodiment of the present invention. The broadcast receiver 1801 according to the present invention may include a reception unit 1802, a demultiplexer 1803 and/or a decoder 1804.

A broadcast signal received by the reception unit 1802 may be demodulated and then subjected to channel decoding. The channel-decoded broadcast signal may be input to the demultiplexer 1803 to be demultiplexed into a video stream and a subtitle stream. The output of the demultiplexer may be input to the decoder 1804. The decoder may include a video decoder and an XML parser. That is, the video stream may be decoded by a video decoder and the subtitle stream may be decoded by a subtitle decoder or parsed by an XML parser, thereby outputting video data and subtitle data. Here, the video decoder and the XML parser may exchange metadata with each other. That is, the XML parser may compare the metadata of video and the metadata of the subtitles as described above. Here, the metadata to be compared may include dynamic ranges, color gamuts, bit depths, etc. of the video and the subtitles. In addition, the metadata of the display of the receiver and the metadata of the subtitles may be compared. Here, the metadata to be compared may include dynamic ranges, color gamuts, bit depths, etc. of the display environment and the subtitles.

In particular, in the present invention, if a wide color gamut (WCG) and a high dynamic range (HDR) of the UHD image quality elements are included in the service (e.g., DVB UHD-1 phase 2, BD UHD-FE, etc.), it is possible to provide information on the image quality elements to the receiver as subtitle production criteria. If the subtitle production environment and the display environment are different, the receiver may appropriately modify the color or luminance of the subtitles according to the display environment. The broadcast receiver may modify the expression method of the XML subtitles in corresponding to the above-described video elements. The video data and the subtitle data are synchronized and displayed by the receiver.

In particular, in the present invention, even when DVB UHD phase 2 is provided, metadata may be generated and provided to the receiver such that a phase-1 receiver receives subtitles. That is, it is possible to provide a subtitle service with backward compatibility. The receiver may select or transform subtitle expression information suitable for the receiver based on the metadata and display the subtitles. A detailed description thereof was given above. The video data and the subtitle data may be synchronized and displayed by the receiver.

Figure 22:
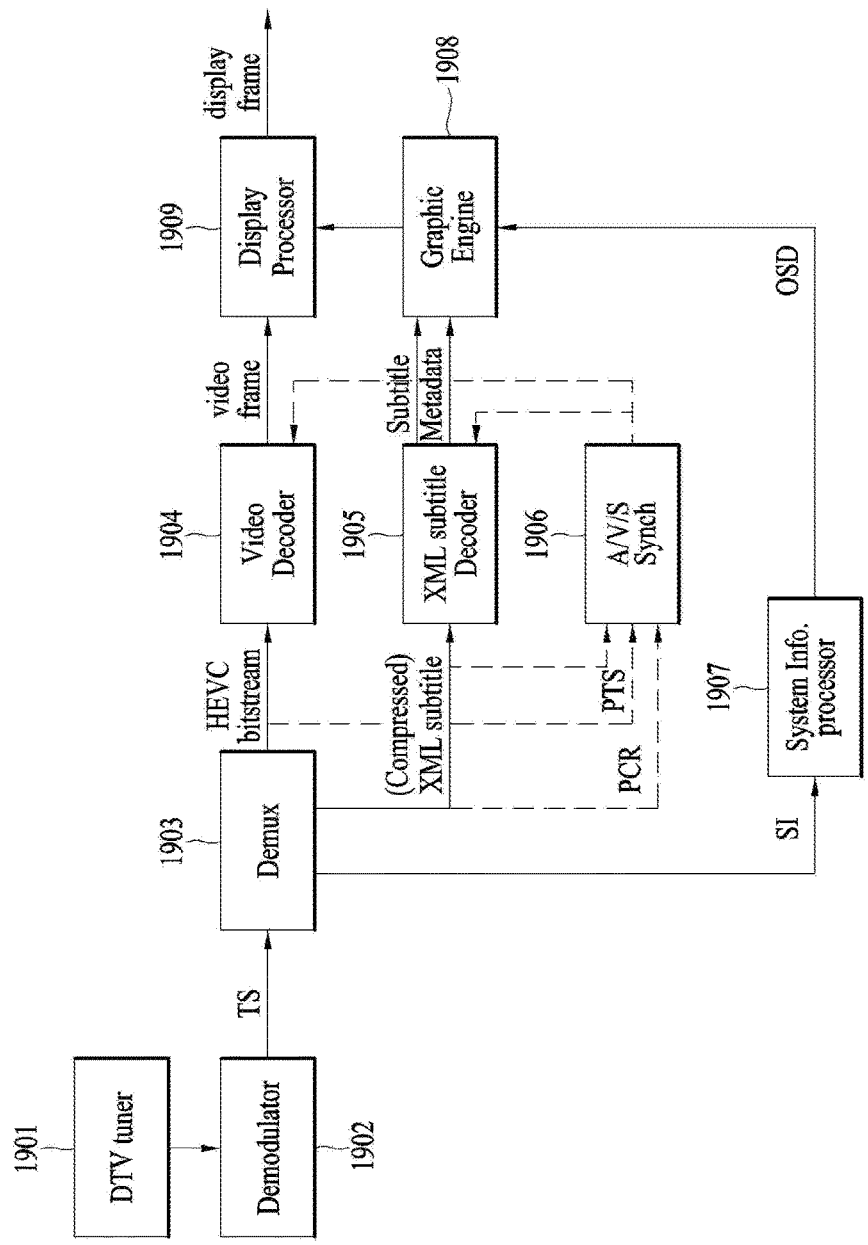
FIG. 22 is a diagram showing the configuration of a broadcast receiver according to an embodiment of the present invention in detail.

FIG. 22 is a diagram showing the configuration of a broadcast receiver according to an embodiment of the present invention in detail. The broadcast receiver may include a reception unit 1901, a demodulator 1902, a demultiplexer 1903, a video decoder 1904, an XML subtitle decoder 1905, an audio/video/subtitle (A/V/S) synchronizer 1906, a system information (SI) processor 1907, a graphics engine 1908 and/or a display processor 1909.

The reception unit 1901 may receive a broadcast signal transmitted by the transmitter. The received broadcast signal may be input to the demodulator 1902.

The demodulator 1902 may demodulate the broadcast signal and output a transport stream (TS). The TS may be input to the demultiplexer 1903 to be demultiplexed. The demultiplexed TS may include an HEVC bitstream, XML subtitles and system information (SI). Here, the XML subtitles may include metadata.

The video decoder 1904 may receive and decode the HEVC bitstream and output a video frame.

The XML subtitle decoder 1905 may receive the XML subtitles and extract subtitles. The XML subtitle decoder 1905 may parse the metadata included in the XML subtitles and compare the parsed metadata with the metadata of the video or the display environment. Here, the metadata to be compared may include a dynamic range, a color gamut, a bit depth, etc. The XML subtitle decoder 1905 may convert the metadata of the subtitles depending on whether the compared metadata matches. The XML subtitle decoder 1905 may deliver, to the graphics engine, the metadata of the subtitles and the subtitles without separate transformation if the compared subtitle data matches. In contrast, if the compared subtitle data does not match, the XML subtitle decoder 1905 may convert the metadata of the subtitles and deliver the subtitle data and the converted metadata to the graphics engine. To this end, matching between the subtitles and the video can be enhanced.

As another embodiment, may select or transform the metadata of the subtitles depending on whether the compared metadata matches. The XML subtitle decoder 1905 may deliver, to the graphics engine, the base information and subtitles included in the metadata of the subtitles without separate transformation if the compared subtitle data matches or if a DVB UHD phase-1 receiver is supported. In contrast, if the compared subtitle data does not match or if a DVB UHD phase-2 receiver is supported, the XML subtitle decoder 1905 may select the base information and the supplementary information of the metadata of the subtitles or transform the base information and deliver the subtitle data and the selected or transformed metadata to the graphics engine. To this end, it is possible to adaptively support the quality of the subtitles according to receiver. A detailed description thereof was given above.

The system information processor 1907 may receive SI information output from the demultiplexer 1907 and extract on screen display (OSD) information.

The graphics engine 1908 may receive the subtitles and the metadata of the subtitles from the XML subtitle decoder 1905 and output a subtitle image. The subtitle image is generated based on the subtitles and the metadata of the subtitles and the color, luminance, etc. of the output subtitle image may be changed depending on whether the metadata of the subtitles is converted.

The display processor 1909 may receive the video frame and the subtitles and output a display frame. The display processor 1909 may receive the OSD information in addition to the video frame and the subtitles and output the display frame. The output display frame may be displayed by an image output device and may be displayed along with the XML subtitles and video frame described in the present invention.

Figure 23:
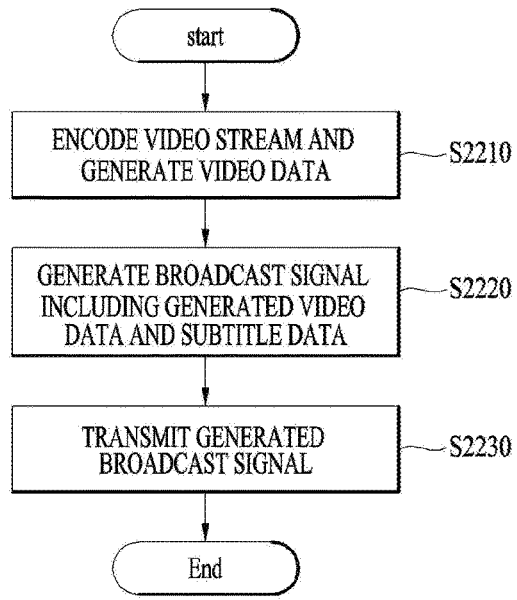
FIG. 23 is a diagram showing a method of transmitting a broadcast signal including an XML subtitles according to an embodiment of the present invention.

FIG. 23 is a diagram showing a method of transmitting a broadcast signal including XML subtitles according to an embodiment of the present invention. The method may include step S2210 of encoding a video stream and generating video data, step S2220 of generating a broadcast signal including the generated video data and subtitle information and step S2230 of transmitting the generated broadcast signal.

Step S2210 of encoding the video stream and generating the video data may include receiving the video stream having resolution of UHD, HD or SD, encoding the video stream and generating the video data. Here, the video stream may be encoded by high efficiency video coding (HEVC). SML subtitle data may also be generated. As described above, the XML subtitle data may include metadata of the subtitles and the metadata may include XML subtitle related data suitable for a UHD broadcast. That is, the metadata may include information on dynamic range, color gamut, bit depth and EOTF information, which may have values corresponding to a wide color gamut (WCG) and a high dynamic range (HDR) of the UHD broadcast.

As another embodiment, that is, the metadata may include dynamic range, color gamut, bit depth and EOTF information and this information may have values corresponding to the wide color gamut (WCG) and high dynamic range (HDR) of the UHD broadcast. In addition, the metadata may include dynamic range, color gamut, bit depth and EOTF information per receiver capability and thus the subtitle expression information may be selected according to receiver, thereby adaptively supporting subtitle expression according to receiver.

Step S2220 of generating the broadcast signal including the generated video data and the subtitle data may include building a broadcast signal frame and generating a broadcast signal using a modulation process.

Step S2230 of transmitting the generated broadcast signal may include transmitting a transport stream as a broadcast signal.

Figure 24:
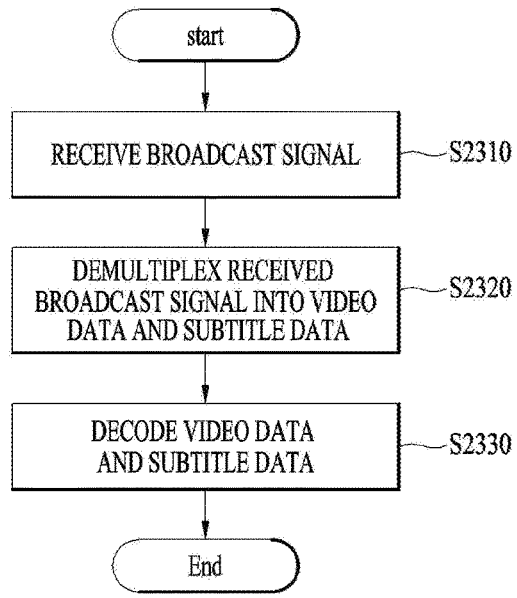
FIG. 24 is a diagram showing a method of receiving a broadcast signal including an XML subtitles according to an embodiment of the present invention.

FIG. 24 is a diagram showing a method of receiving a broadcast signal including XML subtitles according to an embodiment of the present invention. The method of receiving the broadcast signal including the XML subtitle may include step S2310 of receiving a broadcast signal, step S2320 of demultiplexing the received broadcast signal into video data and subtitle data and step S2330 of decoding the video data.

Step S2310 of receiving the broadcast signal may include demodulating the broadcast signal received through the reception unit and performing channel decoding with respect to the broadcast signal.

Step S2320 of demultiplexing the received broadcast signal into the video data and the subtitle data may include demultiplexing the channel-decoded broadcast signal into the video data and subtitle data using the demultiplexer.

Step S2330 of decoding the video data and the subtitle data may include decoding the video data using a video decoder and acquiring the video data. In this step, the subtitle data may be acquired using a subtitle decoder or an XML parser. The receiver may receive XML subtitles and extract subtitles. The receiver may parse and compare the metadata included in the XML subtitles with the metadata of the video or display environment. Here, the metadata to be compared may include a dynamic range, a color gamut, a bit depth, etc. The receiver may convert the metadata of the subtitles depending on whether the compared metadata matches. The receiver may deliver, to the graphics engine, the metadata of the subtitles and the subtitles without separate conversion if the compared subtitle data matches. In contrast, if the compared subtitle data does not match, the receiver may convert the metadata of the subtitles and deliver the subtitle data and the converted metadata to the graphics engine. To this end, it is possible to enhance matching between the subtitles and the video.

As another embodiment, the receiver may select or transform the metadata of the subtitles depending on whether the compared metadata matches. The receiver may deliver, to the graphics engine, the base information and subtitles included in the metadata of the subtitles without separate transformation if the compared subtitle data matches or if DVB UHD phase-1 receiver is supported. In contrast, if the compared subtitle data does not match or if the receiver supports the base information and supplementary information included in the metadata, the receiver may select or transform the metadata of the subtitles and deliver the subtitle data and the selected or transformed metadata to the graphics engine. To this end, it is possible to enhance matching between the subtitles and the video and to differently support the subtitle service according to receiver. In addition, the metadata of the subtitles described in the present invention may support a subtitle service supporting backward compatibility.

Since UHD considers various properties as the image quality elements, the diversity of content and receiver are highly likely to be increased. However, in the case of text based subtitles, it is not efficient that a unique version be made for each of various video or receiver types. The XML subtitles are applicable independently of the size of video but does not consider change in WCG and HDR. However, using the method of the present invention, it is possible to provide a service having the same quality using a single XML subtitle service with respect to various color gamuts and dynamic range environments. Although the present invention is described from the viewpoint of a receiver, the present invention may be used even in production or subtitle production environments. In addition, the present invention may be used in all broadcast services (e.g. DVB UHD-1 service) using XML based subtitle service in addition to an IP streaming based service. In particular, in the case of DVB, a UHD-1 phase-2 service will be provided so as to satisfy backward compatibility with phase 1, and, in this case, this proposal may be used as a subtitle service method capable of simultaneously satisfying operation of an existing receiver. In addition, in the case of an IP streaming service or storage media, it is possible to provide videos with various image qualities. At this time, the proposed method may be used to support videos with various image qualities using a single subtitle service.

Although the description of the present invention is explained with reference to each of the accompanying drawings for clarity, it is possible to design new embodiment (s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

The image processing method according to the present invention may be implemented as code that can be written to a processor-readable recording medium and can thus be read by a processor. The processor-readable recording medium may be any type of recording device in which data can be stored in a processor-readable manner Examples of the processor-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that processor-readable code is written thereto and executed therefrom in a decentralized manner Functional programs, code, and code segments needed to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

Mode for Invention

Various embodiments have been described in the best mode for carrying out the invention.

INDUSTRIAL APPLICABILITY

The present invention is repetively available in broadcast and video signal processing fields.

The invention claimed is:

1. A method of transmitting a broadcast signal, the method comprising:
   encoding video data having one of Standard Definition (SD) resolution, High Definition (HD) resolution, or Ultra High Definition (UHD) resolution;
   generating Extensible Markup Language (XML)-based subtitle data,
   wherein the XML-based subtitle data include subtitle text and subtitle metadata,
   wherein the subtitle metadata include base dynamic range information and supplementary dynamic range information of the subtitle text to modify a luminance of the subtitle text by performing dynamic range mapping when the luminance of the subtitle text is different from a luminance supported by a displaying device that displays the subtitle text, and
   wherein the subtitle metadata further include base Electro Optical Transfer Function (EOTF) information and supplementary EOTF information that are used for luminance linearization prior to the dynamin range mapping;
   multiplexing the video data and the XML-based subtitle data; and
   transmitting a broadcast signal including the multiplexed data.

2. The method according to claim 1, wherein the supplementary dynamic range information includes contrast ratio information for identifying a ratio of maximum luminance to minimum luminance.

3. The method according to claim 1, wherein the subtitle metadata further include information on a wide color gamut a for a high-quality broadcast.

4. The method according to claim 1, wherein the subtitle metadata further include information on a color gamut of the subtitle text and a bit depth of the ssubtitle text.

5. The method according to claim 1, wherein the subtitle metadata includes base information and supplementary information on a color gamut of the subtitle text and a bit depth of the subtitle text.

6. A method of receiving a broadcast signal, the method comprising:
   receiving the broadcast signal including video data and Extensible Markup Language (XML)-based subtitle data, the video data having one of Standard Definition (SD) resolution, High Definition (HD) resolution, or Ultra High Definition (UHD) resolution, wherein the XML-based subtitle data include subtitle text and subtitle metadata and wherein the subtitle metadata include base dynamic range information and supplementary dynamic range information of the subtitle text;
   demultiplexing the video data and the XML-based subtitle data from the broadcast signal;
   decoding the video data;
   modifying a luminance of the subtitle text by performing dynamic range mapping based on the subtitle metadata when the luminance of the subtitle text is different from a luminance supported by a displaying device that displays the subtitle text; and
   displaying the decoded video data and the subtitle text having the modified luminance,
   wherein the subtitle metadata further include base Electro Optical Transfer Function (EOTF) information and supplementary EOTF information that are used for luminance linearization prior to the dynamin range mapping.

7. The method according to claim 6, wherein the supplementary dynamic range information includes contrast ratio information for identifying a ratio of maximum luminance to minimum luminance.

8. The method according to claim 6, wherein the subtitle metadata further include information on a wide color gamut for a high-quality broadcast.

9. The method according to claim 6, wherein the subtitle metadata further include information on a color gamut of the subtitle text and a bit depth of the subtitle text.

10. The method according to claim 6, wherein the subtitle metadata further include base information and supplementary information on a color gamut of the subtitle text and a bit depth of the subtitle text.

11. A transmission device for transmitting a broadcast signal, the transmission device comprising:
    an encoder to code video data having one of Standard Definition (SD) resolution, High Definition (HD) resolution, or Ultra High Definition (UHD) resolution;
    a multiplexer to multiplex the video data and Extensible Markup Language (XML)-based subtitle data,
    wherein the XML-based subtitle data include subtitle text and subtitle metadata,
    wherein the subtitle metadata include base dynamic range information and supplementary dynamic range information of the subtitle text to modify a luminance of the subtitle text by performing dynamic range mapping when the luminance of the subtitle text is different from a luminance supported by a displaying device that displays the subtitle text, and
    wherein the subtitle metadata further include base Electro Optical Transfer Function (EOTF) information and supplementary EOTF information that are used for luminance linearization prior to the dynamin range mapping; and
    a transmitter to transmit a broadcast signal including the multiplexed data.

12. The transmission device according to claim 11, wherein the supplementary dynamic range information includes contrast ratio information for identifying a ratio of maximum luminance to minimum luminance.

13. A reception device for receiving a broadcast signal, the reception device comprising:
    a receiver to receive the broadcast signal including video data and Extensible Markup Language (XML)-based subtitle data, the video data having one of Standard Definition (SD) resolution, High Definition (HD) resolution, or Ultra High Definition (UHD) resolution, wherein the XML-based subtitle data include subtitle text and subtitle metadata and wherein the subtitle metadata include base dynamic range information and supplementary dynamic range information of the subtitle text;
    a demultiplexer to demultiplex the video data and the XML-based subtitle data from the broadcast signal; and
    a decoder to decode the video data; and
    a processor to modify a luminance of the subtitle text by performing dynamic range mapping based on the subtitle metadata when the luminance of the subtitle text is different from a luminance supported by a displaying device that displays the subtitle text,
    wherein the displaying device displays the decoded video data and the subtitle text having the modified luminance and
    wherein the subtitle metadata further include base Electro Optical Transfer Function (EOTF) information and supplementary EOTF information that are used for luminance linearization prior to the dynamin range mapping.

14. The reception device according to claim 13, wherein the subtitle metadata includes base information and supplementary information on a color gamut of the subtitle text and a bit depth of the subtitle text.

* * * * *